(12) United States Patent
Kerr

(10) Patent No.: US 7,113,196 B2
(45) Date of Patent: *Sep. 26, 2006

(54) COMPUTING DEVICE WITH DYNAMIC ORNAMENTAL APPEARANCE

(75) Inventor: Duncan Kerr, San Francisco, CA (US)

(73) Assignee: Apple Computer, Inc., Cupertino, CA (US)

( * ) Notice: Subject to any disclaimer, the term of this patent is extended or adjusted under 35 U.S.C. 154(b) by 245 days.

This patent is subject to a terminal disclaimer.

(21) Appl. No.: 10/075,520

(22) Filed: Feb. 13, 2002

(65) Prior Publication Data

US 2002/0190975 A1    Dec. 19, 2002

Related U.S. Application Data

(60) Provisional application No. 60/315,571, filed on Aug. 28, 2001, provisional application No. 60/298,364, filed on Jun. 15, 2001.

(51) Int. Cl.
G09G 3/36        (2006.01)
(52) U.S. Cl. ....................... 345/905; 315/292
(58) Field of Classification Search .................. 345/82, 345/905, 163, 168, 170, 83, 469.1, 661; 455/90; 340/7.61, 815.73, 815.65; 713/310, 320; 362/85, 800; 315/292
See application file for complete search history.

(56) References Cited

U.S. PATENT DOCUMENTS 4,277,665 A    7/1981  Kondo et al.
(Continued)

FOREIGN PATENT DOCUMENTS

DE        10137919        6/2002
(Continued)

OTHER PUBLICATIONS

Website    www.colorkinetics.com/products/controllers/index.htm, "Controllers fee the power. it's Herculean", downloaded Apr. 17, 2001.

(Continued)

*Primary Examiner*—Richard Hjerpe
*Assistant Examiner*—Kevin M. Nguyen
(74) *Attorney, Agent, or Firm*—Beyer Weaver & Thomas, LLP

(57) ABSTRACT

The invention pertains to electronic devices capable of dynamically changing their ornamental or decorative appearance, i.e., the outer appearance as seen by a user. The electronic devices generally include an illuminable housing. The illuminable housing, which includes at least one wall configured for the passage of light, is configured to enclose, cover and protect a light arrangement as well as functional components of the electronic device. The light arrangement, which generally includes one or more light sources, is configured to produce light for transmission through the light passing wall(s) of the illuminable housing. The transmitted light illuminates the wall(s) thus giving the wall a new appearance. That is, the transmitted light effectively alters the ornamental or decorative appearance of the electronic device. In most cases, the light is controlled so as to produce a light effect having specific characteristics or attributes. As such, the electronic device may be configured to provide additional feedback to the user of the electronic device and to give users the ability to personalize or change the look of their electronic device on an on-going basis. That is, a housing of the electronic device is active rather than passive, i.e., the housing has the ability to adapt and change. For example, the light may be used to exhibit a housing behavior that reflects the desires or moods of the user, that reflects inputs or outputs for the electronic device, or that reacts to tasks or events associated with operation of the electronic device.

7 Claims, 14 Drawing Sheets

U.S. PATENT DOCUMENTS

| | | | |
|---|---|---|---|
| 4,789,774 A | 12/1988 | Koch et al. | |
| 4,845,481 A | 7/1989 | Havel | |
| 4,847,736 A | 7/1989 | Ho | |
| 5,008,870 A | 4/1991 | Vessa | |
| 5,222,076 A | 6/1993 | Ng et al. | |
| 5,305,013 A | 4/1994 | Daniels | |
| D348,905 S | 7/1994 | Smid | |
| 5,339,213 A | 8/1994 | O'Callaghan | |
| 5,387,901 A | 2/1995 | Hardt | |
| 5,388,357 A | 2/1995 | Malita | |
| 5,406,729 A | 4/1995 | Bejin | |
| 5,422,751 A | 6/1995 | Lewis et al. | |
| 5,450,221 A | 9/1995 | Owen et al. | |
| 5,490,647 A | 2/1996 | Rice | |
| 5,515,244 A | 5/1996 | Levins et al. | |
| 5,615,945 A | 4/1997 | Tseng | |
| 5,644,320 A | 7/1997 | Rossi | |
| 5,677,698 A | 10/1997 | Snowdon | |
| 5,689,400 A | 11/1997 | Ohgami et al. | |
| 5,706,168 A | 1/1998 | Erler et al. | |
| 5,742,120 A | 4/1998 | Lin | |
| 5,774,098 A * | 6/1998 | Kawashima et al. | 345/83 |
| 5,825,351 A | 10/1998 | Tam | |
| 5,828,341 A | 10/1998 | Delamater | |
| 5,867,131 A | 2/1999 | Camp, Jr. et al. | |
| 5,914,709 A | 6/1999 | Graham et al. | |
| 5,938,772 A * | 8/1999 | Welch | 713/320 |
| 6,016,038 A | 1/2000 | Mueller et al. | |
| 6,018,332 A * | 1/2000 | Nason et al. | 345/661 |
| 6,030,088 A | 2/2000 | Scheinberg | |
| 6,035,180 A | 3/2000 | Kubes et al. | |
| 6,058,634 A | 5/2000 | McSpiritt | |
| 6,089,893 A | 7/2000 | Yu et al. | |
| 6,096,984 A | 8/2000 | Howell et al. | |
| 6,109,760 A | 8/2000 | Salatrik et al. | |
| 6,150,774 A | 11/2000 | Mueller et al. | |
| 6,161,944 A | 12/2000 | Leman | |
| 6,166,496 A | 12/2000 | Lys et al. | |
| 6,190,017 B1 | 2/2001 | Lai | |
| 6,211,626 B1 | 4/2001 | Lys et al. | |
| 6,217,182 B1 | 4/2001 | Shepherd et al. | |
| 6,224,244 B1 | 5/2001 | Burys | |
| 6,285,420 B1 | 9/2001 | Mizumo et al. | |
| 6,289,466 B1 * | 9/2001 | Bayramoglu et al. | 713/310 |
| 6,292,901 B1 | 9/2001 | Lys et al. | |
| 6,320,941 B1 | 11/2001 | Tyroler | |
| 6,340,868 B1 | 1/2002 | Lys et al. | |
| 6,357,887 B1 | 3/2002 | Novak | |
| D457,667 S | 5/2002 | Piepgras et al. | |
| D457,669 S | 5/2002 | Piepgras et al. | |
| D457,974 S | 5/2002 | Piepgras et al. | |
| D458,395 S | 6/2002 | Piepgras et al. | |
| D463,610 S | 9/2002 | Piepgras et al. | |
| 6,459,919 B1 | 10/2002 | Lys et al. | |
| 6,476,726 B1 | 11/2002 | Pederson | |
| 6,486,873 B1 * | 11/2002 | McDonough et al. | 345/163 |
| D468,035 S | 12/2002 | Blanc et al. | |
| 6,492,908 B1 * | 12/2002 | Cheng | 340/815.73 |
| 6,494,593 B1 | 12/2002 | An et al. | |
| 6,507,338 B1 | 1/2003 | Liao et al. | |
| 6,528,954 B1 | 3/2003 | Lys et al. | |
| 6,548,967 B1 | 4/2003 | Dowling et al. | |
| 6,577,080 B1 | 6/2003 | Lys et al. | |
| 6,608,453 B1 | 8/2003 | Morgan et al. | |
| 6,608,996 B1 * | 8/2003 | Laurikka et al. | 340/7.55 |
| 6,624,597 B1 | 9/2003 | Dowling et al. | |
| 6,690,362 B1 | 2/2004 | Motoyama et al. | |
| 6,720,745 B1 | 4/2004 | Lys et al. | |
| 6,816,149 B1 | 11/2004 | Alsleben | |
| 6,888,322 B1 | 5/2005 | Dowling et al. | |
| 2002/0113555 A1 | 8/2002 | Lys et al. | |
| 2003/0002246 A1 | 1/2003 | Kerr | |
| 2003/0161093 A1 | 8/2003 | Lam et al. | |
| 2004/0141321 A1 | 7/2004 | Dowling et al. | |
| 2004/0201573 A1 | 10/2004 | Yu et al. | |
| 2005/0036300 A1 | 2/2005 | Dowling et al. | |
| 2005/0047132 A1 | 3/2005 | Dowling et al. | |

FOREIGN PATENT DOCUMENTS

| | | |
|---|---|---|
| EP | 0564127 | 10/1993 |
| JP | 2001147739 | 5/2001 |
| WO | 00/28510 | 5/2000 |
| WO | 02/10847 | 2/2002 |

OTHER PUBLICATIONS

Website www.colorkinetics.com/products/lights/icolor/index.htm, "iColor Series iWant. iNeed. iHave to have", downloaded Apr. 17, 2001.

Website til.info.apple.com/techinfo.nsf/artnum/n58417, Tech Info Library—1Book: How to Determine Battery Charge Status, downloaded Jun. 3, 2001.

Website www.cksauce.com/products/lightwand.htm, "LightWand" downloaded Jan. 28, 2002.

Website www.cksauce.com/products/minilightwand.htm, "MiniLightWand" downloaded Jan. 28, 2002.

Website www.cksauce.com/products/lightwasher.htm, "LightWasher" downloaded Jan. 28, 2002.

Website www.cksauce.com/products/lightorb.htm, "LightOrb" downloaded Jan. 28, 2002.

Website www.cksauce.com/products/lightsprite.htm, "LightSprite" downloaded Jan. 28, 2002.

Website www.cksauce.com/products/lightsaucer.htm, "LightSaucer" downloaded Jan. 28, 2002.

Website www.jtech.com/products/guest_alert.htm, "GuestAlert Guest Paging Systems", downloaded Jan. 28, 2002.

Website www.2.consumer.philips.com/global/b2c/ce/catalog/product.jhtml?divId=0&groupID=TV, downloaded Jan. 28, 2002.

Circuit City advertisement for Philips Somba 13" stereo TV.

Mahn et al., "HP-PAC: A New Chassis and Housing Concept for Electronic Equipment", Aug. 1994, Hewlett-Packard Journal.

Outpost.com advertisement for "Blue Cold Cathode Tube Light", downloaded Jul. 25, 2003.

U.S. Appl. No. 09/389,915, filed Sep. 3, 1999.

Apple Computer iBook Hardware, General Topics; iBook Ports and Connectors, Figs. 1 and 2.

* cited by examiner

COMPUTING DEVICE WITH DYNAMIC ORNAMENTAL APPEARANCE

CROSS REFERENCE TO RELATED APPLICATIONS

This application claims the priority of the following U.S. Patent Applications, which is hereby incorporated herein by reference:

Application No.: 60/298,364, filed on Jun. 15, 2001 and entitled "ACTIVE ENCLOSURE FOR COMPUTING DEVICE"

Application No.: 60/315,571, filed on Aug. 28, 2001 and entitled "COMPUTING DEVICE WITH DYNAMIC ORNAMENTAL APPEARANCE";

This application is also related to the following U.S. Patent Applications, which are hereby incorporated herein by reference:

application Ser. No.: 09/389,915, filed on Sept. 3, 1999 and entitled "DISPLAY HOUSING FOR COMPUTING DEVICE"

application Ser. No.: 09/426,408, filed on Oct. 25, 1999 and entitled "HOUSING FOR A COMPUTING DEVICE"

application No.: 10/075,964, filed concurrently and entitled "ACTIVE ENCLOSURE FOR COMPUTING DEVICES".

BACKGROUND OF THE INVENTION

1. Field of the Invention

The present invention relates generally to a computing device. More particularly, the present invention relates to improved features for changing the appearance of a computing device.

2. Description of the Related Art

Most computing devices, including portable computers and desktop computers, give feedback to its user via a display screen or speakers. As is generally well known, display screens are used to display textual or graphical information to a user and speakers are used to output sound to the user. For example, display screens may be used to display a graphical user interface (GUI) and speakers may be used to output music or audio messages. Computing devices also give feedback to users via small indicators positioned on the computing device. By way of example, some indicators use light to indicate that a computing device (or the display screen of the computing device) is turned on/off or that a disk drive is reading or writing data to a disk. Although displays, speakers and indicators work well, they are limited to the type of feedback they give a user. For example, while playing a movie with a DVD drive of a computing device, the display screen only outputs the video associated with the movie, the speaker only outputs the audio associated with the movie, and the indicator only indicates that a movie is playing the DVD drive. Thus, it would be desirable to provide additional feedback to a user.

Computing devices also have housings that enclose the components and circuitry associated with operating the computing devices. Housings generally serve to shield and protect the components and circuitry from adverse conditions such as impact and dust. In some cases, the housings are configured to surround all the components of the computing device while in other cases the housings are configured to surround individual or a subset of components. For example, a housing may be used to enclose the central processing unit (CPU), display screen, disk drive, and speaker to form a single unit. As another example, a plurality of different housings may be used to individually enclose the CPU, display screen, disk drive and speakers to form a plurality of individual units.

As is generally well known, housings for computing devices in particular product lines are typically manufactured with the same appearance, i.e., they look the same. For example, housings from a particular product line may have the same box-like shape and/or the same neutral color. This can be discouraging to computer users who desire computers that are more personalized or to computer users who desire computers that are different than another user's computer. Recently, manufacturers have attempted to remedy this problem by offering brightly colored or translucent housings for computing devices. For example, some computer and telephone manufacturers now sell a variety of housings, which have different colors and patterns. By way of example, the iMAC model, which is produced by Apple Computer of Cupertino, Calif., is available in various colors and patterns.

Although these recent advances make substantial inroads to overcoming the same old appearance, the housings for the computing device remain passive structures that exhibit a non-adaptable or non-changing appearance. That is, a colored or patterned housing has a single color or pattern associated therewith that does not change overtime.

External lights have been used in some devices associated with displaying video to enhance the viewing experience of the video. Unfortunately, however, none of the external lights have been capable of changing the ornamental appearance of the device housing. That is, the external lights are typically located outside the periphery of the housing and are typically arranged to alter the environment in which the video is shown rather than the device housing itself (the appearance of the housing remains the same even with the use of lights).

Thus, there is a need for improvements in appearances of housings for computing devices.

SUMMARY OF THE INVENTION

The invention pertains to electronic devices capable of dynamically changing their ornamental or decorative appearance.

The invention relates, in one embodiment, to a computer system. The computer system includes a microprocessor configured to control operation of the computer system. The microprocessor produces or receives monitored events while controlling operation of the computer system. The computer system further includes a data storage device. The computer system additionally includes a light system configured to provide a dynamic light effect based on the monitored events. The computer system also includes a housing containing the microprocessor, the data storage device, and the light system. The light system provides the housing with a dynamic ornamental appearance.

The invention relates, in another embodiment, to a method for illuminating a housing of a general purpose computer system. The method includes monitoring computer system events. The method further includes illuminating at least a non-insignificant portion of the housing of the general purpose computer system in accordance with the computer system events.

The invention relates, in another embodiment, to a method for illuminating a housing of a computing device, the computing device having a screen display. The method includes sampling a plurality of regions on the screen display to acquire color indicators for the plurality of regions. The method further includes illuminating a plurality of regions of the housing of the computing device based on the color indicators.

The invention relates, in another embodiment, to a method for illuminating a housing of a computing device having a screen display. The method includes determining acquire color indicators for a plurality of regions on the screen display. The method further includes illuminating a plurality of zones of the housing of the computing device based on the color indicators.

The invention relates, in another embodiment, to a method for method for illuminating a housing of a computing system having a screen display. The method includes sampling regions of the screen display to acquire color indicators. The method further includes associating the color indicators acquired to a plurality of illuminable regions of the housing of the computing system. The method also includes driving at least one light element at the illuminable regions of the housing in accordance with the color indicators mapped thereto, thereby illuminating the regions of the housing.

The invention relates, in another embodiment, to a method for controlling light elements provided internal to a housing for computer system hardware. The method includes monitoring the computer system components to obtain status information. The method further includes determining illumination characteristics for the housing based on the status information and predetermined configuration information. The method additionally includes determining driving signals for the light elements in accordance with the illumination characteristics. The method also includes controlling the light elements using the driving signals.

The invention relates, in another embodiment, to a computer system having a computer device including a computer component for performing an operation associated with the computer system, and an illuminable housing. The computer system includes an event monitor configured to track a computer event associated with the computer system. The computer system further includes a light effect manager operatively coupled to the event monitor. The light effect manager is configured to generate light control signals when the computer event is executed by the computer system. The computer system also includes a light arrangement operatively coupled to the light effect manager and disposed in the housing. The light arrangement is configured to illuminate the illuminable housing so as to dynamically change the ornamental appearance of the housing in accordance with the light control signals associated with the computer event.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Figure 1:
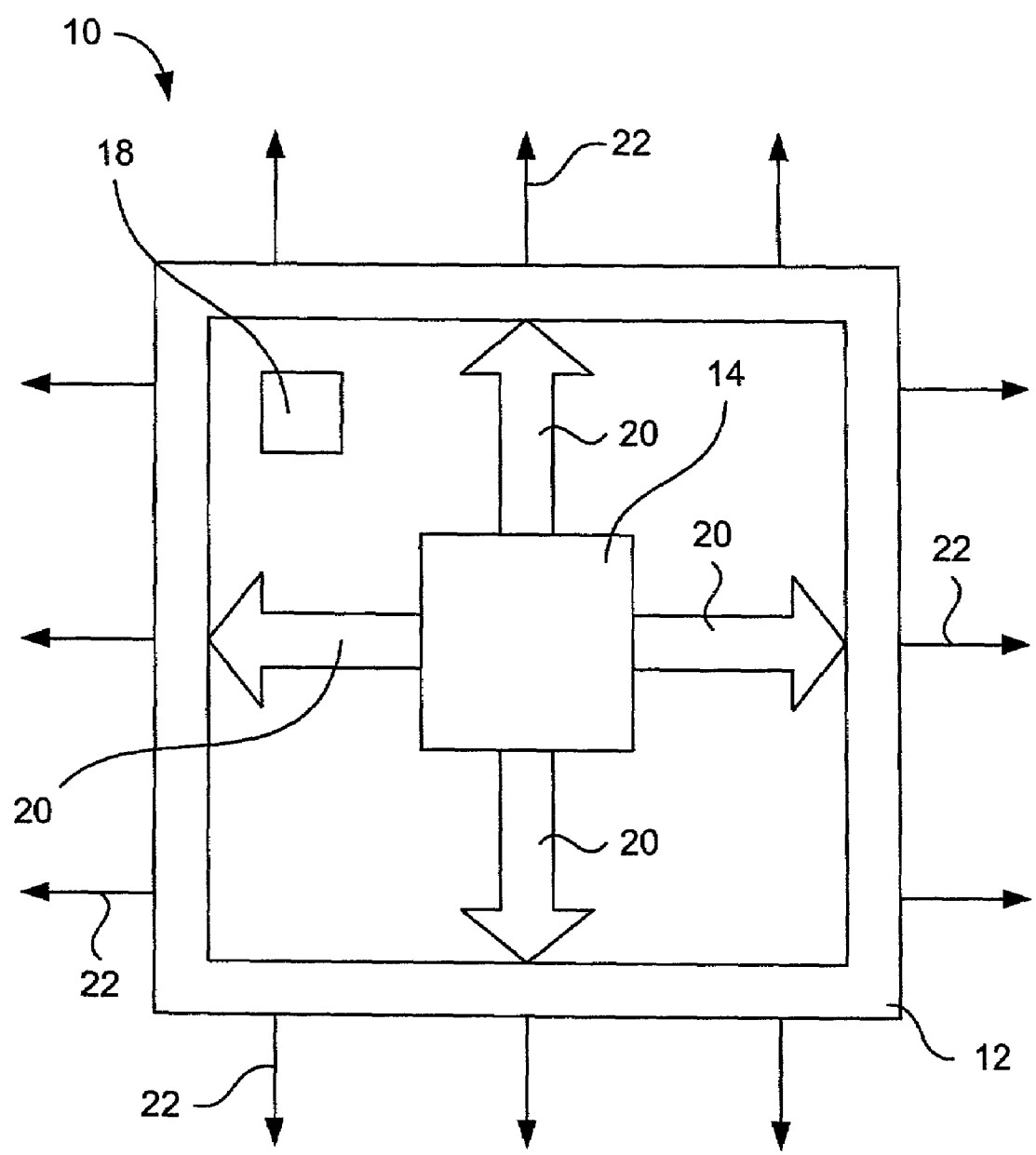
FIG. 1 is a simplified diagram of an electronic device, in accordance with one embodiment of the present invention.

The invention pertains to electronic devices capable of dynamically changing their ornamental or decorative appearance, i.e., the outer appearance as seen by a user. The electronic devices generally include an illuminable housing. The illuminable housing, which includes at least one wall configured for the passage of light, is configured to enclose, cover and protect a light arrangement as well as functional components of the electronic device. For example, in the case of a desktop computer, the functional components may include a processor for executing instructions and carrying out operations associated with the computer, and in the case of a display monitor, the functional components may include a display for presenting text or graphics to a user. The light arrangement, which generally includes one or more light sources, is configured to produce light for transmission through the light passing wall (or walls) of the illuminable housing. As should be appreciated, the transmitted light illuminates the wall(s) thus giving the wall a new appearance. That is, the transmitted light effectively alters the ornamental or decorative appearance of the electronic device. By way of example, a light source capable of producing green light may cause the light passing wall to exude green.

In most cases, the light is controlled so as to produce a light effect having specific characteristics or attributes. As such, the electronic device may be configured to provide additional feedback to the user of the electronic device and to give users the ability to personalize or change the look of their electronic device on an on-going basis. That is, a housing of the electronic device is active rather than passive, i.e., the housing has the ability to adapt and change. For example, the light may be used to exhibit a housing behavior that reflects the desires or moods of the user, that reflects inputs or outputs for the electronic device, or that reacts to tasks or events associated with operation of the electronic device.

It is contemplated that the present invention may be adapted for any of a number of suitable and known consumer electronic products that perform useful functions via electronic components. By way of example, the consumer electronic products may relate to computing devices and systems that process, send, retrieve and/or store data. The computing devices and systems may generally relate to desktop computers (both segmented and all-in-one machines) that sit on desks, floors or other surfaces, portable computers that can be easily transported by a user, or handheld computing devices. By way of example, portable computers include laptop computers, and handheld computing devices include personal digital assistants (PDAs) and mobile phones.

Embodiments of the invention are discussed below with reference to FIGS. 1–17. However, those skilled in the art will readily appreciate that the detailed description given herein with respect to these figures is for explanatory purposes as the invention extends beyond these limited embodiments.

FIG. 1 is a simplified diagram of a chameleonic electronic device 10, in accordance with one embodiment of the invention. The word "chameleonic" refers to the fact that the electronic device 10 has the ability to alter its visual appearance. The chameleonic electronic device 10 generally includes a housing 12 configured to form an external protective covering of the chameleonic electronic device 10 and a light system 14 configured to adjust the illuminance or pigmentation of the housing 12. The housing 12 of the chameleonic electronic device 10 surrounds and protects internal components 18 disposed therein. The internal components 18 may be a plurality of electrical components that provide specific functions for the chameleonic electronic device 10. For example, the internal electrical components 18 may include devices for generating, transmitting and receiving data associated with operating the electronic device. In one embodiment, the chameleonic electronic device is a component of a computer system, as for example, a general purpose computer. As such, the internal electrical components may include a processor, memory, controllers, I/O devices, displays and/or the like.

The chameleonic electronic device 10 is configured to change its visual appearance via light. That is, the housing 12 is configured to allow the passage of light and the light system 14 is configured to produce light for transmission through the housing 12. In one embodiment, the light system 14 includes a light arrangement (not shown). The light arrangement, which is disposed inside the housing 12 and which includes at least one light source, is configured to emit light 20 incident on the inner surface of the housing 12. As should be appreciated, light 22 that is transmitted through the wall of the housing 12 changes the look of the housing 12 and thus the visual appearance of the chameleonic electronic device 10. By way of example, the light 22 may cause the housing 12 to exude a dynamic illuminance that changes over time. For example, the housing may exude a color or pattern that blinks on/off, fades in/out or that changes to a different color or pattern.

In some cases, the light system 14 is arranged to cooperate with the electrical components 18. For example, events associated with the electrical components 14 may be monitored, and the light system 14 may be controlled based on the monitored events. As such, an illumination effect corresponding to a specific event may be produced. For example, the housing 12 may be configured to exude a blinking red coloration when an event has been implemented. Although the light system 14 may cooperate with the electrical components 18, it should be understood that the electrical components 18 and the light system 14 are distinct devices serving different functions. That is, the electrical components 18 are generally configured to perform functions relating to operating the chameleonic electronic device 10, and the light system 14 is generally configured to change the appearance of the housing 12 thereof.

Figure 2:
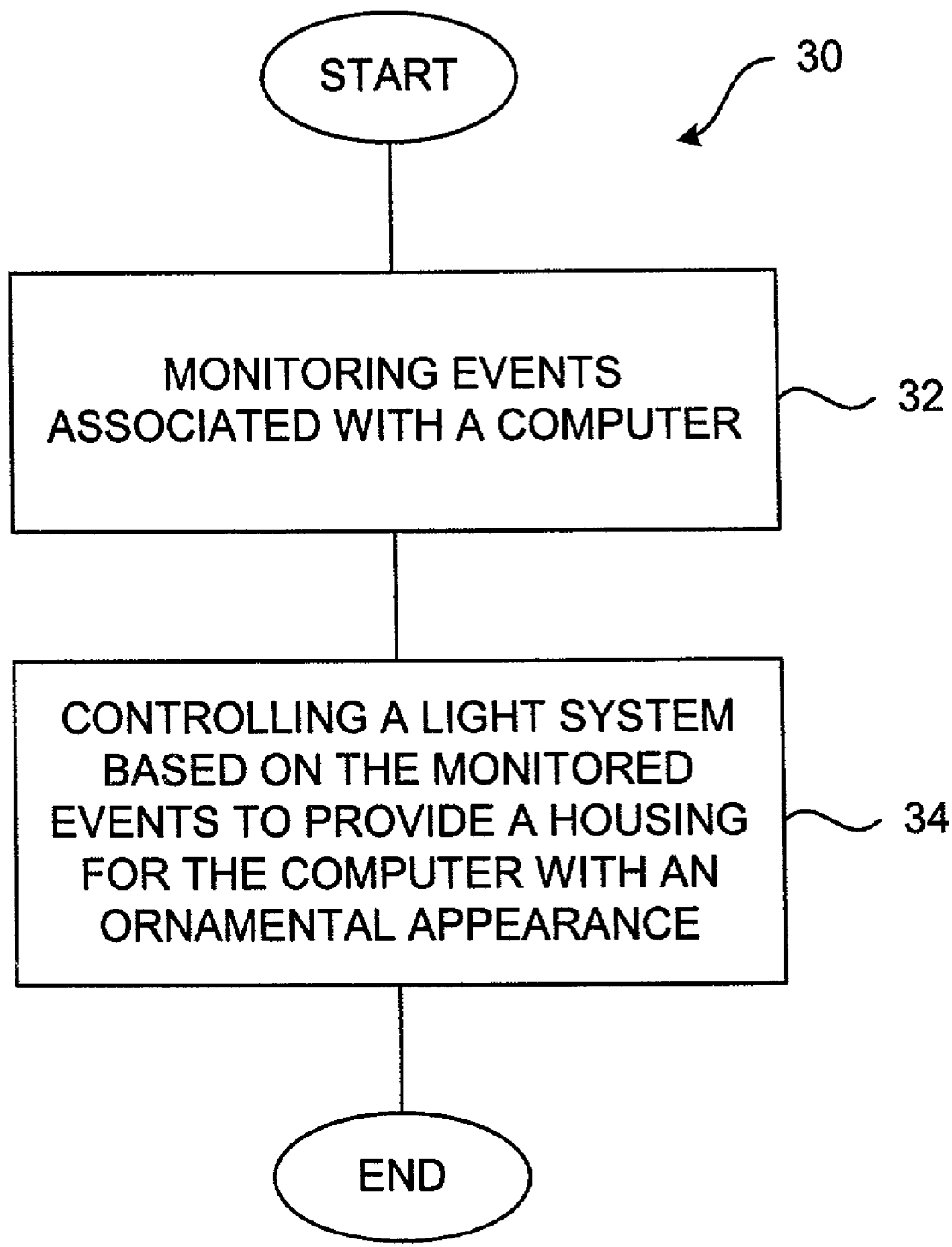
FIG. 2 is a flow diagram of computer illumination processing, in accordance with one embodiment of the present invention.

FIG. 2 is a flow diagram of computer illumination processing 30, in accordance with one embodiment of the invention. The computer illumination processing 30 is performed by a computer (or computer system) to provide the computer with an illumination effect, as for example, the illumination of a housing relating to the computer. The illumination effect for the housing is provided by a light system. Typically, the light system is internal to the housing being illuminated. In one embodiment, the computer corresponds to a general purpose computer such as an IBM compatible computer or an Apple compatible computer. By way of example, the Apple compatible computer may include different models such as the iMac, G3, G4, Cube, iBook, or Titanium models, which are manufactured by Apple Computer, Inc. of Cupertino, Calif.

The computer illumination processing 30 begins at block 32 where events associated with a computer are monitored. In one embodiment, the events being monitored are identified by an operating system or a microprocessor utilized within the computer. The events can take many forms such as operating system events or microprocessor events. By way of example, the events may relate to signals, conditions or status of the computer.

Following block 32, the process proceeds to block 34 where a light system, associated with the computer, is controlled 34 based on the monitored events to provide a housing, also associated with the computer, with an ornamental appearance. In other words, the computer illumination processing 30 operates to provide the housing of the computer with a dynamic ornamental appearance that varies in accordance with the monitored events of the computer. By way of example, the housing and light system may generally correspond to the housing and light system described in FIG. 1. After the light system is controlled at block 34, the computer illumination processing 30 is complete and ends. It should be noted, however, that the processing can be repeatedly performed or performed whenever a new event occurs.

Figure 3:
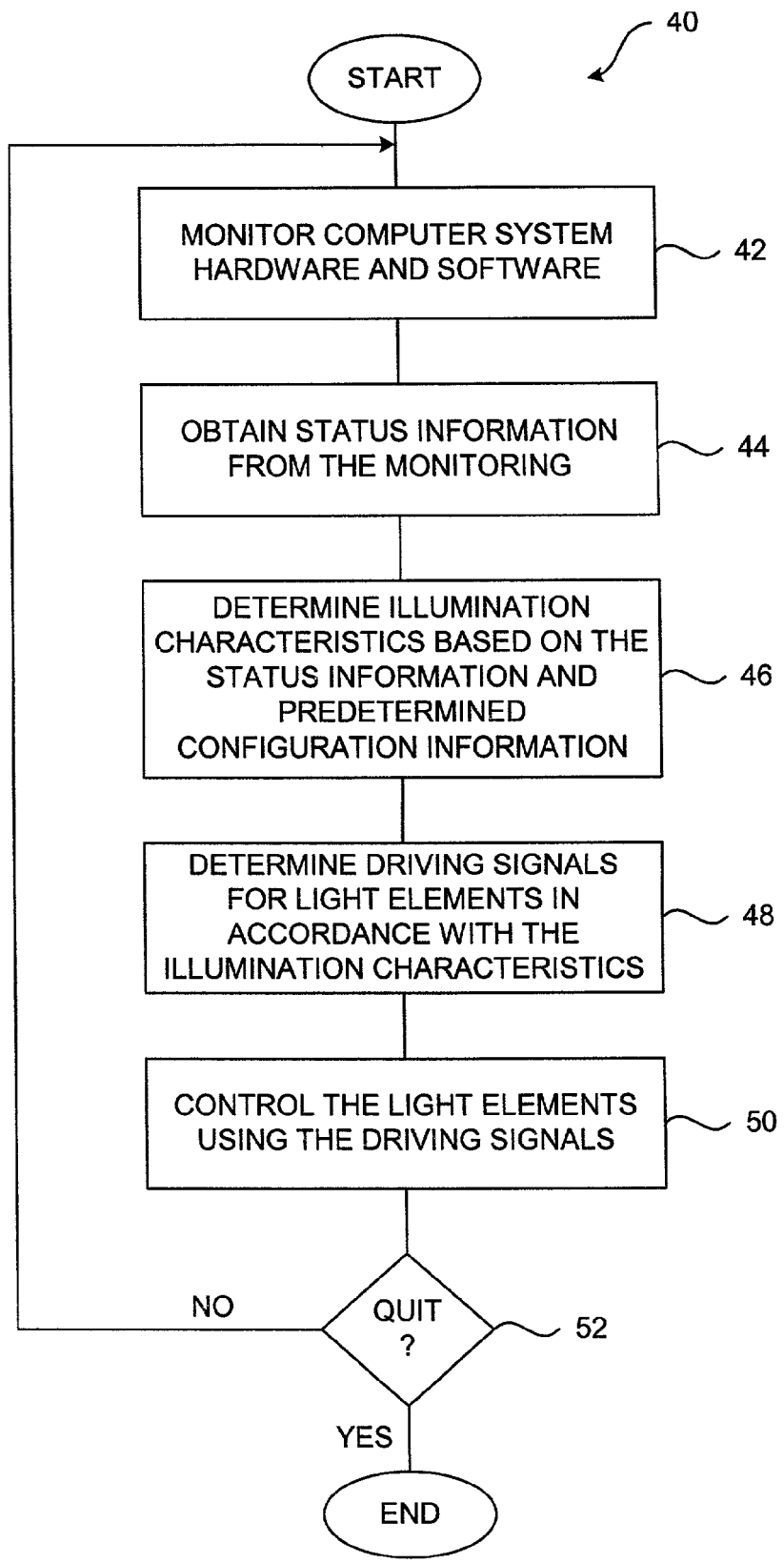
FIG. 3 is a flow diagram of computer illumination processing, in accordance with another embodiment of the present invention.

FIG. 3 is a flow diagram of computer illumination processing 40, in accordance with another embodiment of the invention. The computer illumination processing 40 is performed by a computer system (or computer) to provide the computer system with an illumination effect, as for example, the illumination of a housing associated with the computer system. The illumination effect for the housing is provided by a light system. Typically, the light system is internal to the housing being illuminated. In one embodiment, the computer system corresponds to a general purpose computer such as an IBM compatible computer or an Apple compatible computer. By way of example, the Apple compatible computer may include different models such as the iMac, G3, G4, Cube, iBook, or Titanium models, which are manufactured by Apple Computer, Inc. of Cupertino, Calif.

The computer illumination processing 40 generally begins at block 42 where computer system hardware and software is monitored. Here, one or more devices, units or systems associated with the computer system can be monitored. By way of example, the devices or systems being monitored can include one or more of a microprocessor, an operating system, an application or utility program, or input/output (I/O) devices. After block 42, the process proceeds to block 44 where status information associated with the devices, units or systems is obtained from the monitoring. By way of example, status information may correspond to I/O connectivity status, wireless connectivity status, network connectivity status, processor status (e.g., sleep, shutdown), program status (e.g., errors, alerts, awaiting inputs, received new mail, loading), remote status (e.g., retrieving information from the internet), and/or the like.

After block 44, the process proceeds to block 46 where illumination characteristics are determined. Illumination characteristics generally refer to how a housing associated with the computer is illuminated to produce an ornamental appearance. The illumination characteristics are generally based on the status information and predetermined configuration information. In one embodiment, the predetermined configuration information identifies a type and nature of the illumination (e.g., which lights are operated, how long the light sources are operated, what color the light source output, etc.) that is to be provided for a specific status information. By way of example, a blinking red coloration may be identified when a program status such as an error is monitored.

In one embodiment, the predetermined configuration information is stored in a database. Thus, the computer consults the information held in the database in order to determine the illumination characteristics for a specific event. The predetermined configuration information stored in the database may be accessed by a user through a light control menu, which may be viewed on a display screen as part of a GUI interface. The light control menu may include light control settings pertaining to one or more events of the computer. In fact, the light control menu may serve as a control panel for reviewing and/or customizing the light control settings, i.e., the user may quickly and conveniently review the light control settings and make changes thereto. Once the user saves the changes, the modified light control settings will be employed (e.g., as predetermined configuration information) to handle future events transmitted and/or received through the computer.

After the illumination characteristics have been determined, the process proceeds to block 48 where driving signals for light elements associated with the light system are determined in accordance with the illumination characteristics. Typically, the light elements are arranged within a portion of the computer system. For example, the light elements could be arranged within a primary housing of the computer system. In another embodiment, the light elements could be arranged within a housing for a peripheral device associated with the computer system. After the driving signals are determined, the process proceeds to block 50 where the driving signals are used to control the light elements. For example, the driving signals may actuate one or more of the light elements so as to emit light incident on an inner surface of a housing. Once the drive signals control the light elements, the ornamental appearance of the housing is thus altered. Typically, the housing has one or more portions that are configured for allowing the passage of light, thereby causing the light to be transmitted therethrough which effectuates the ornamental appearance of the housing.

After using the driving signals, the process proceeds to block 52 where a decision is made as to whether the computer illumination processing 40 should end. When the decision 52 determines that the computer illumination processing 40 should not end, the computer illumination processing 40 returns to repeat the operation 42 and subsequent operations so that the illumination characteristics can be continuously updated in accordance with the status information. On the other hand, when the decision 52 determines that the computer illumination processing 40 should end, the computer illumination processing 40 is complete and ends. In general, the computer illumination processing 40 can be repeatedly performed or performed in an event driven manner.

Figure 4:
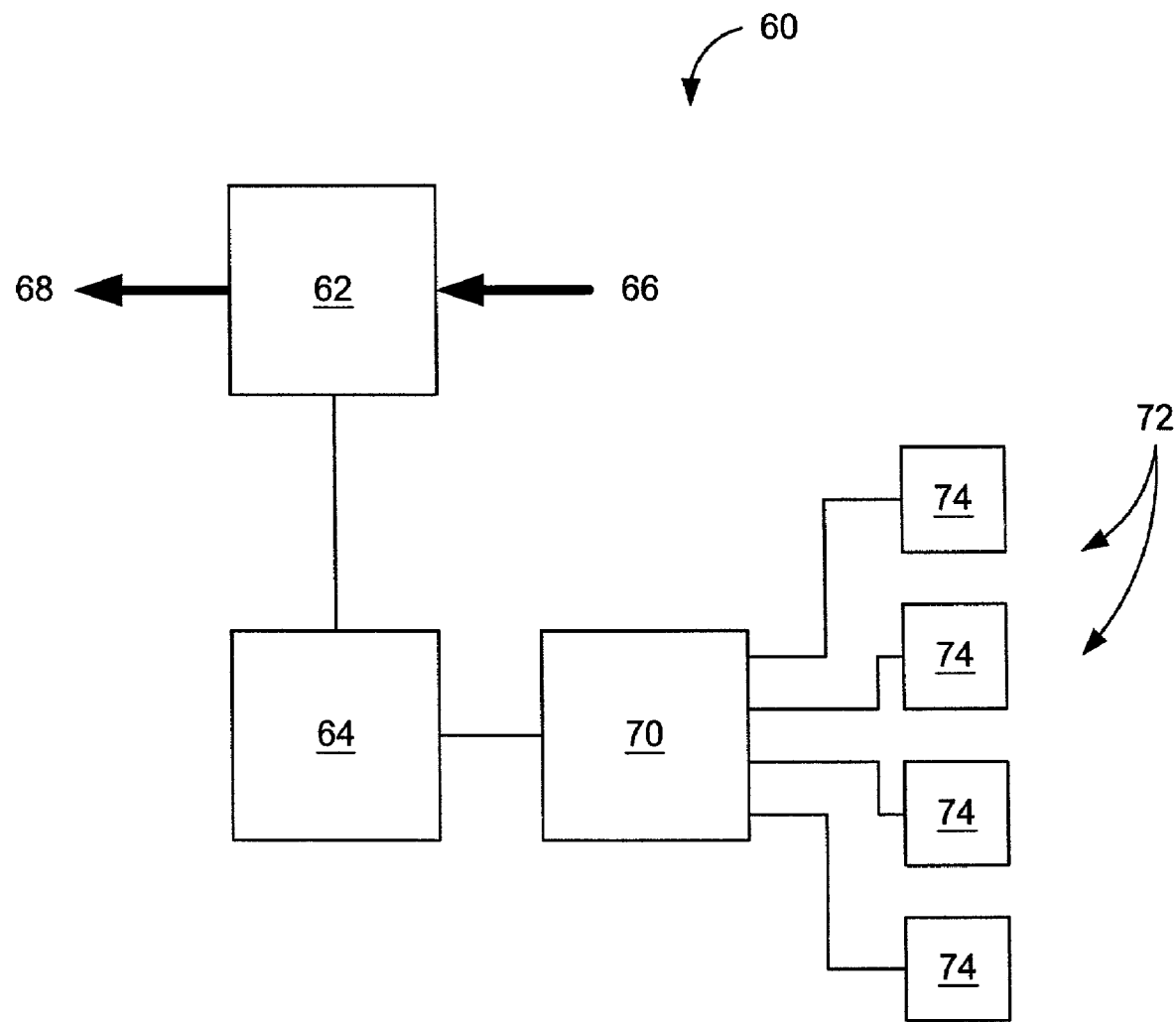
FIG. 4 is a block diagram of a computing device, in accordance with one embodiment of the present invention.

FIG. 4 is a block diagram of a computing device 60, in accordance with one embodiment of the present invention. By way of example, the computing device 60 may correspond to the chameleonic electronic device 10 shown in FIG. 1. The computing device 60 generally includes a variety of computer components 62, which as an example may correspond to the electrical components 18 in FIG. 1. The computer components 62 are generally configured to process, retrieve and store data associated with the computing device 60. By way of example, the computer components 62 may include a CPU (central processing unit), I/O controllers, display controllers, memory and the like. The computer components may also include operating systems, utility programs, application programs and/or the like.

The computing device 60 also includes an event monitor 64 operatively coupled to the computer components 62. The event monitor 64 is configured to track specific data through the computer components. For example, the event monitor 64 may be configured to track input data 66 and/or output data 68. Although shown outside the computer components, the input data and output data may correspond to internal inputs and outputs generated between individual parts of the computer components as well as to external inputs and outputs generated outside the computer components. By way of example, interior inputs/outputs may relate to data that is passed between a CPU and an I/O controller, and exterior inputs/outputs may relate to data that is passed between an I/O controller and an I/O device such as a keyboard, mouse, printer and the like. In one embodiment, the event monitor is part of the functionality provided by the computer components. For example, the event monitor may be included in the CPU. In another embodiment, the event monitor provides functionality independent of the computer components. For example, the event monitor may be a separate processor chip that is connected to a chip housing the CPU.

The computing device 60 also includes a light effect manager 70 operatively coupled to the event monitor 64. The light effect manager 70 is configured to direct light control signals to a light arrangement 72, and more particularly to a plurality of light elements 74 disposed inside a housing. The light control signals are generally based on the events tracked by the event monitor 64. That is, as events are processed by the computer components 62, the light effect manager 70 directs light control signals to the light elements 74. The light control signals carry illumination characteristics pertaining to the desired light effect that each of the light elements is to provide at the housing. That is, the light control signals sent to each of the light elements may cause the light elements to emit the same light effect (e.g., all emitting green light at the same intensity) or a different light effect (e.g., one element emitting green light while another emits blue light). These light elements 74 work together to produce a light effect that dynamically changes the ornamental appearance of the housing.

In one embodiment, the light effect manger 70 is configured to determine illumination characteristics based on the specific events (or data) monitored and the corresponding predetermined configuration information. As explained earlier, predetermined configuration information relates to information that is selected by a user and stored. In one embodiment, the light effect manager 70 is part of the functionality provided by the computer components 62. For example, the light effect manager 70 may be included in the processor chip of the computing device 60 that also includes the CPU. In another embodiment, the light effect manager 70 provides functionality independent of the computer components. For example, the light effect manager 70 may be a separate processor chip that is connected to a separate chip housing the CPU.

Figure 5:
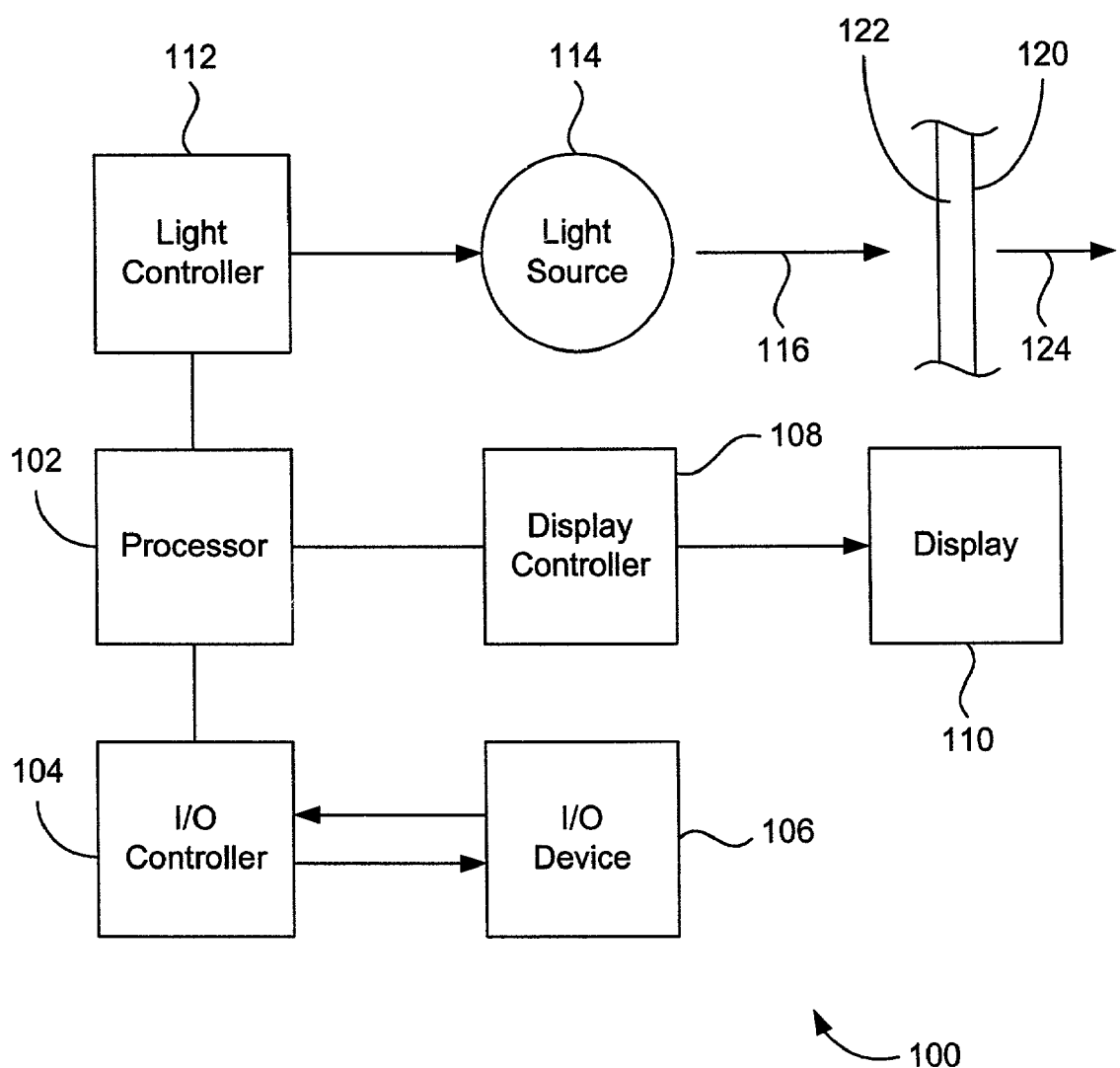
FIG. 5 is a block diagram of a computer system, in accordance with one embodiment of the present invention.

FIG. 5 is a block diagram of a computer system 100, in accordance with one embodiment of the present invention. By way of example, the computer system may be a general purpose computer that corresponds to the computing device 60 described in FIG. 4. The computer system 100 generally includes a processor 102 (e.g., CPU or microprocessor) configured to execute instructions and to carry out operations associated with the computer system 100. By way of example, the processor 102 may execute instructions under the control of an operating system or other software.

The computer system 100 also includes an input/output (I/O) controller 104 that is operatively coupled to the processor 102. The I/O controller 104 is generally configured to control interactions with one or more I/O devices 106 that can be coupled to the computer system 100. The I/O controller 104 generally operates by exchanging data between the computer system 100 and the I/O devices 106 that desire to communicate with the computer system 100. In some cases, the I/O devices 106 may be connected to the I/O controller 104 through wired connections such as through wires or cables. In other cases, the I/O devices 106 may be connected to the I/O controller 104 through wireless connections. By way of example, the I/O devices 106 may be internal or peripheral devices such as memory, disk drives, keyboards, mice, printers, scanners, speakers, video cameras, MP3 players and the like. The I/O devices 106 may also be network-related devices such as network cards or modems.

The computer system 100 additionally includes a display controller 108 that that is operatively coupled to the processor 102. The display controller 108 is configured to process display commands to produce text and graphics on a display device 110. By way of example, the display 110 may be an display such as a monochrome display, color graphics adapter (CGA) display, enhanced graphics adapter (EGA) display, variable-graphics-array (VGA) display, super VGA display, liquid crystal display (LCD), and the like.

The computer system 100 further includes a light source controller 112 that is operatively coupled to the processor 102. The light source controller 112 generally provides processing of light commands from the processor 102 to produce light 116 in a controlled manner via a light source 114. By way of example, the light source 114 may be one or more light emitting diodes (LED), lasers, incandescent light bulbs, fluorescent light bulbs, neon tubes, liquid crystal displays (LCD), and the like, that are arranged to produce light and more particularly colored light. In the illustrated embodiment, the light source 114 is configured to include at least one light emitting diode (LED). LED's offer many advantages over other light sources. For example, LED's are relatively small devices that are energy efficient and long lasting. LED's also run relatively cool and are low in cost. Furthermore, LED's come in various colors such as white, blue, green, red and the like. Typically, the light source 114 includes a plurality of LED's that cooperate to produce the desired light effect. The plurality of LED's may be a plurality of individual LED's or a plurality of integrated LED arrays having a plurality of individual LED's that are grouped together. In one embodiment, a LED array having at least one green LED, one red LED and one blue LED is used. It is generally believed that these three colors are the primary colors of light and therefore they can be mixed to produce almost any color.

The light source 114 is generally disposed inside an enclosure 120 that covers and protects some aspect of the computing system 100. More particularly, the enclosure 120 can cover and protect one or more computer components having functionality used in the operation of the computing system 100. By way of example, the enclosure 120 may be configured to cover one or more of the components described above. The enclosure 120 generally includes a wall 122 that is configured for transmitting light therethrough. As such, at least a portion of the light 116, which is made incident on the wall 122, via the light source 114, passes through the wall 122, thereby producing a light effect 124 that alters the visual appearance of the enclosure 120 and thus the visual appearance of the computing system 100.

Light effect is generally defined as the way in which the light 11 6, produced by the light source 114 and controlled by the light source controller 112, acts or influences the enclosure 120. Metaphorically speaking, the enclosure is the canvas, the light is the paint, and the light effect is the painting. Accordingly, in some cases, the light effect is arranged to cover the entire wall 122 while in other cases, the light effect is arranged to cover only a portion of the wall 122.

Light effects may be categorized as static (non-changing over time) or dynamic (changing over time). By way of example, static light effects may cause the enclosure to continuously exude a fixed color such as blue, a fixed shade of a color such as light blue, a fixed pattern or artistic design such as rainbow, stripes, dots, flowers and the like, or a fixed orientation such as a color or pattern located in a specific region of the enclosure. On the other hand, dynamic light effects may cause the enclosure to exude different colors, intensities or patterns at different times and in different orientations. That is, the coloration, intensities, patterns and position thereof may vary. For example, dynamic light effects may include light effects that change at least partially from a first color, intensity or pattern to a second color, intensity or pattern (e.g., from red to blue to light blue to rainbow, blinking on and off or fading in and out), that change regionally around the enclosure (e.g., moving from a first side to a second side of the enclosure, moving from center to outer, moving around the enclosure in a continuous fashion, a pattern that starts at a certain point on the enclosure and radiates out, etc.), or any combination thereof.

Although not shown in FIG. 5, the computer system may include other components such as buses, bridges, connectors, wires, memory, and the like. As is generally well known, buses provide a path for data to travel between components of computer systems. In addition, bridges serve to perform adjustments necessary to bridge communication between different buses, i.e., various buses follow different standards. Further, memory provides a place to hold data that is being used by a computer system. By way of example, memory may be a Read-Only Memory (ROM) or a Random-Access Memory (RAM). RAM typically provides temporary data storage for use by at least the processor 102, and ROM typically stores programming instructions for use with the processor 102.

Although not shown, the placement of the enclosure 120 relative to the components described above may be widely varied. In one embodiment, the enclosure 120 is configured to cover the entire computer system described above. For example, the enclosure may be configured to cover the processor, the I/O controller, the I/O device, the display controller, the display, the light controller and the light source. In another embodiment, the enclosure is configured to cover only a portion of the computer system described above. For example, the illuminable enclosure may be configured to cover the processor, the I/O controller, the display controller, the light controller and the light source. In addition, the illuminable enclosure may be configured to cover the display and the light source. Moreover, the illuminable enclosure may be configured to cover a peripheral I/O device and the light source. In yet another embodiment, the enclosure can represent a plurality of enclosures that are configured to separately cover individual or sets of components of the computer system 100 described above. For example, a first enclosure may configured to cover the processor, the I/O controller, an internal I/O device, the display controller, the light controller and a first light source; a second enclosure may be configured to cover the display and a second light source; and a third enclosure may be configured to cover another peripheral I/O device and a third light source. It should be understood that the above embodiments are representative and thus not limitations, i.e., other configurations of the enclosure(s) may be used.

Figure 6:
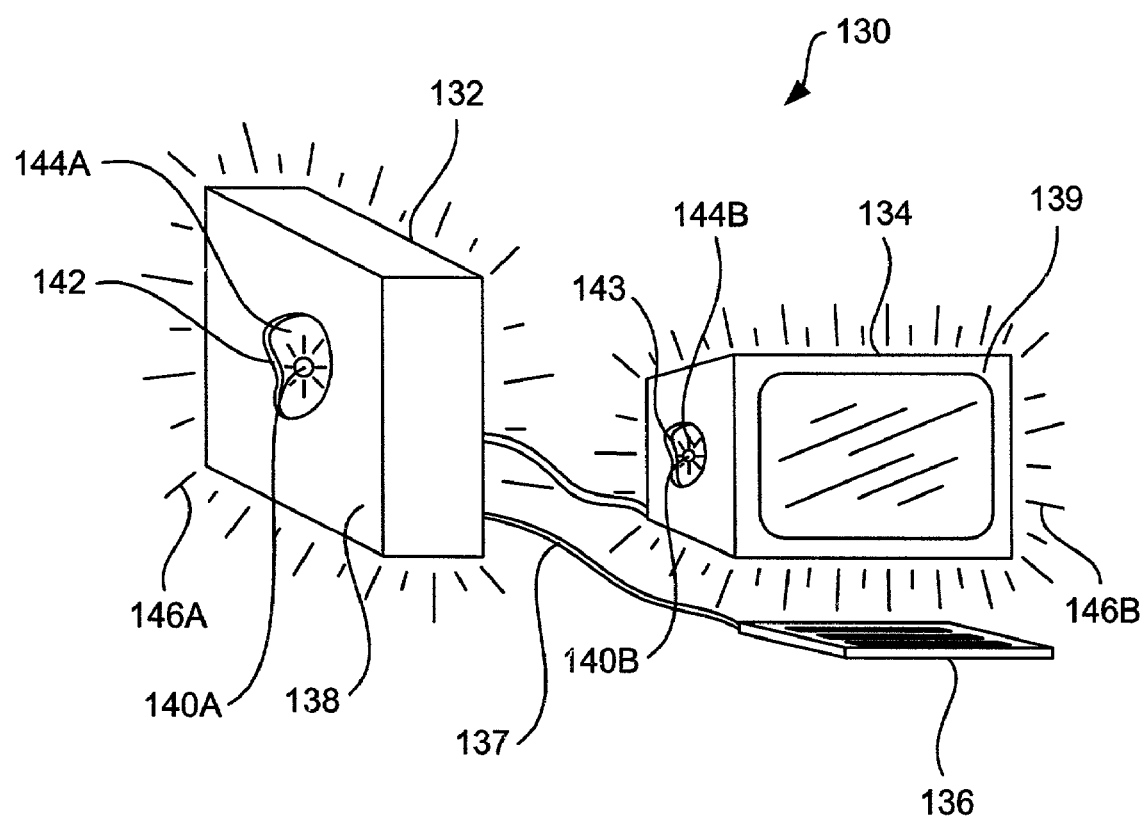
FIG. 6 is a perspective diagram of a computer system, in accordance with one embodiment of the present invention.

FIG. 6 is a perspective diagram of a general purpose computer 130, in accordance with one embodiment of the invention. By way of example, the general purpose computer 130 may correspond to the computer system 100 shown in FIG. 4 or 5. The computer 130 generally includes a base 132 and a monitor 134 (or display) operatively coupled to the base 132. In the illustrated embodiment, the base 132 and monitor 134 are separate components, i.e., they each have their own housing. That is, the base 132 includes a base housing 138 and the monitor 134 includes a monitor housing 139. Both housings are configured to enclose various internal components associated with operation of the respective devices. In general, the housings 138, 139 serve to surround their internal components at a peripheral region thereof so as to cover and protect their internal components from adverse conditions.

With regards to the base 132, the internal components may be processors, controllers, bridges, memory and the like. Often these internal components take the format of integrated circuits; however, the internal components can take various other forms (e.g., circuit boards, cables, fans, power supplies, batteries, capacitors, resistors). The internal components may also be various I/O devices such as a hard drive, a disk drive, a modem and the like. The base 132 may also include a plurality of I/O connectors for allowing connection to peripheral devices such as a mouse, a keyboard, a printer, a scanner, speakers and the like. In the illustrated embodiment, the base housing 138 serves to surround at least a processor and a controller. By way of example, the controller may be an input/output (I/O) controller, a display controller, a light source controller and/or the like. With regards to the monitor 134, the internal components may be a display screen. As is generally well known, the display screen is used to display the graphical user interface (including perhaps a pointer or cursor) as well as other information to a user.

In most cases, the housings 138, 139 include one or more walls 142, 143, respectively, that serve to structurally support the internal components in their assembled position within the housings. The walls 142, 143 also define the shape or form of the housings, i.e., the contour of the walls embody the outward physical appearance of the housings. The contour may be rectilinear, curvilinear or both. In the illustrated embodiment, the base housing 138 includes six (6) rectangular and planar walls that form a box-shaped housing. It should be understood, however, that this is not a limitation and that the form and shape of the housings may vary according to the specific needs or design of each computer system. By way of example, the housing may be formed in simple shapes such as a cube, a cylinder, a pyramid, a cone, or a sphere, or in complex shapes such as a combination of simple shapes or an object such as an apple, a house, a car or the like.

In one embodiment, the base housing 138 includes at least one light passing wall configured to allow the passage of light. In most cases, the light passing wall constitutes a significant percentage area of the housing. In the illustrated embodiment, the entire housing 138 is illuminable and thus all six of the rectangular and planar walls 142 are configured to allow the passage of light. It should be noted, however, that this is not a limitation and that the amount of light passing walls may vary according to the specific needs of each computer system. For example, the housing may include any number of opaque walls and light passing walls. Still further, a light passing wall needed not pass light over its entire surface. In other words, only a non-trivial portion of a wall needs to pass light to be considered a light passing wall. The light passing walls are generally formed from a translucent or semi-translucent medium such as, for example, a clear and/or frosted plastic material.

For ease of discussion, a portion of the wall 142 has been removed to show a light source 140A disposed inside the housing 138. The light source 140A is configured to generate light 144A so as to illuminate the interior of the housing 138, and more particularly the interior of the light passing walls 142. The light 144A, which is made incident on the interior of the walls 142 by the light source 140A, is thereby transmitted through the walls 142 of the housing 138 to produce a light effect 146A that alters the visual appearance of the housing 138 and thus the visual appearance of the base 132. That is, the light 144A generated inside the housing 138 and passing through the walls 142 effectively changes the visual appearance of the housing 138 as seen by a user when looking at the housing 138. By way of example, the light effect 146A may cause housing 138 to exude a fixed or varying color or pattern. Although a single light source 140A is shown in FIG. 5, it should be noted that this is not a limitation and that a plurality of light sources may be used. For example, individual light sources may be strategically positioned within the housing 138 so as to illuminate specific zones or regions of the housing 138.

In another embodiment, the monitor housing 139 includes at least one light passing wall configured to allow the passage of light. In most cases, the light passing wall constitutes a significant percentage area of the housing. In the illustrated embodiment, the entire housing 139 is illuminable and thus all of its walls 143 are configured to allow the passage of light. It should be noted, however, that this is not a limitation and that the amount of light passing walls may vary according to the specific needs of each computer system. For example, the housing may include any number of opaque walls and light passing walls. Still further, a light passing wall needed not pass light over its entire surface. In other words, only a non-trivial portion of a wall needs to pass light to be considered a light passing wall. The light passing walls are generally formed from a translucent or semi-translucent medium such as, for example, a clear and/or frosted plastic material.

Again, for ease of discussion, a portion of the wall 143 has been removed to show a light source 140B disposed inside the housing 139. The light source 140B is configured to generate light 144B so as to illuminate the interior of the housing 139, and more particularly the interior of the light passing walls 143. The light 144B, which is made incident on the interior of the walls 143 by the light source 140B, is thereby transmitted through the walls 143 of the housing 139 to produce a light effect 146B that alters the visual appearance of the housing 139 and thus the visual appearance of the monitor 134. That is, the light 144B generated inside the housing 139 and passing through the walls 143 effectively changes the visual appearance of the housing 139 as seen by a user when looking at the housing 139. By way of example, the light effect 146B may cause housing 139 to exude a fixed or varying color or pattern. Although a single light source 140B is shown in FIG. 5, it should be noted that this is not a limitation and that a plurality of light sources may be used. For example, individual light sources may be strategically positioned within the housing 139 so as to illuminate specific zones or regions of the housing 139.

In one embodiment, a characteristic glow is produced at the outer surface of the walls 142, 143 when the light 144 is transmitted therethrough. By characteristic glow, it is meant that the coloration of the walls 142, 143 emanates from the wall 142, 143 rather than from the light source 140, i.e., the light is altered during transmission through the walls 142, 143. In most cases, the characteristic glow is produced by a light directing element disposed in or on the wall 142, 143. The light directing element is generally configured to scatter incident light by reflection and/or refraction. By way of example, the light directing element may be a layer, coating or texture on the surface of the wall, or it may be an additive disposed inside the wall. An example light directing elements that may be used is described in greater detail in a co-pending patent application entitled, "ACTIVE ENCLOSURE FOR COMPUTING DEVICE"; application Ser. No. 10/075,964, filed on even date and incorporated herein by reference.

Figure 7:
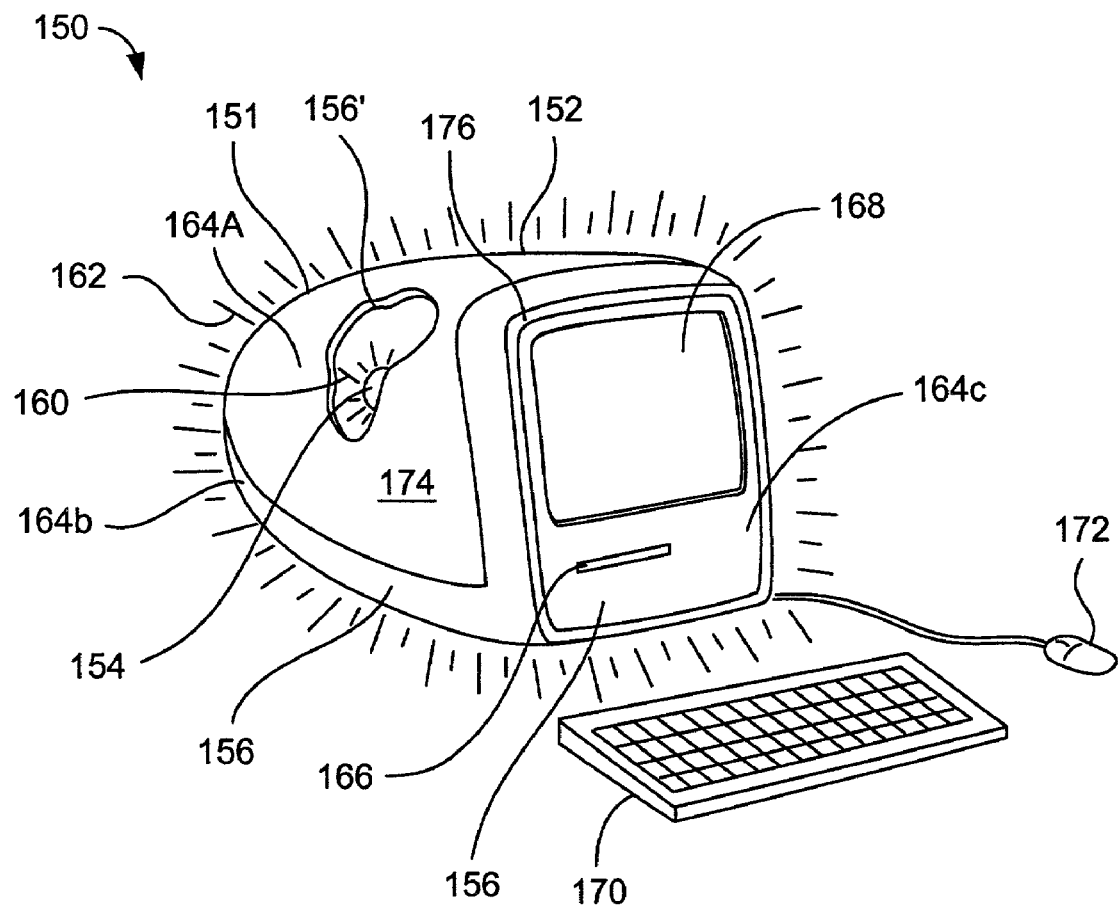
FIG. 7 is a perspective diagram of a computer system, in accordance with another embodiment of the present invention.

FIG. 7 is a perspective diagram of a general purpose computer 150, in accordance with another embodiment of the invention. By way of example, the general purpose computer 150 may correspond to the computer system shown in FIG. 4 or 5. The general purpose computer 150 includes an all in one machine 151 that integrates the base and monitor of FIG. 6 into a single housing 152. The housing 152 is generally configured to enclose various internal components associated with operation of the computer 150. In general, the housing 152 serves to surround the internal components at a peripheral region thereof so as to cover and protect the internal components from adverse conditions. In one embodiment, the housing 152 includes a plurality of cases 164 that cooperate to form the housing 152. Any number of cases may be used. In the illustrated embodiment, the cases 164 consist of a bottom case 164A, a top case 164B and a front case 164C.

The internal components may be processors, controllers, bridges, memory and the like. Often these internal components take the format of integrated circuits; however, the internal components can take various other forms (e.g., circuit boards, cables, fans, power supplies, batteries, capacitors, resistors). In the illustrated embodiment, the housing 152 serves to surround at least a processor and a controller. By way of example, the controller may be an input/output (I/O) controller, a display controller, a light source controller and/or the like. The internal components may also be various I/O devices such as a hard drive, a disk drive, a modem and the like. For example, as shown, the computer 150 may include a disk drive 166 and a display 168. The disk drive 166 is used to store and retrieve data via a disk. The display 168 is used to display the graphical user interface (including perhaps a pointer or cursor) as well as other information to the user. The all in one machine 151 may also include a plurality of I/O connectors for allowing connection to peripheral devices such as a mouse, a keyboard, a printer, a scanner, speakers and the like. By way of example, the computer system 150 may include I/O port connectors for connection to peripheral components such as a keyboard 170 and a mouse 172. The keyboard 170 allows a user of the computer 150 to enter alphanumeric data. The mouse 172 allows a user to move an input pointer on a graphical user interface and to make selections on the graphical user interface.

In most cases, the housing 152 includes one or more walls 156 that serve to structurally support the internal components in their assembled position within the housing. The walls 156 also define the shape or form of the housing, i.e., the contour of the walls embody the outward physical appearance of the housing. The contour may be rectilinear, curvilinear or both.

In one embodiment, the housing 152 includes one or more light passing walls having light passing portions, which are configured to allow the passage of light. The light passing portions may be an edge of the wall or a surface of the wall. The light passing portions may constitute the an entire wall or a portion of a wall, i.e., a light passing wall need not pass light over its entire surface. In other words, only a non-trivial portion of a wall needs to pass light to be considered a light passing wall. In most cases, the light passing portions constitute a significant percentage area of the light passing wall. For example, the amount of light passing area is generally determined by the amount of light needed to pass through the housing in order to effectively change the appearance of the housing so that a user feels differently about the device (e.g., not an indicator). Any suitable arrangement of light passing walls, light passing portions and opaque walls may be used so long as the outward appearance of the system changes.

In the illustrated embodiment, the walls 156' provided by the top case 164 are light passing walls, which are illuminated with light from a light source 154 disposed inside the housing 152. For ease of discussion, a portion of the wall 156' has been removed to show the light source 154 disposed therein. The light source 154 is configured to generate light 160 so as to illuminate the interior of the housing 152, and more particularly the interior of the wall 156'. In general, the light 160, which is made incident on the wall 156' by the light source 154, is transmitted through the wall 156' to produce a light effect 162 that alters the visual appearance of the housing 152 and thus the visual appearance of the computer system 150. That is, the light 160 generated inside the housing 152 and passing through the wall 156' effectively changes the visual appearance of the housing 152 as seen by a user when looking at the housing 152.

The light source 154 is operatively coupled to a light source controller (not shown) that cooperates with the light source 154 to produce the light 160. In general, the light source 154 provides the light 160 for illuminating the housing 152, and more particularly the wall 156, and the light source controller provides processing of light commands to produce the light in a controlled manner. In some implementations, the light 160 is arranged to produce the light effect 162 at a surface 174 of the wall 156. In other implementations, the light 160 is arranged to produce the light effect 162 at an edge 176 of the wall 156. In yet other implementations, the light 160 is arranged to produce a light effect 162 at both the surface 174 and the edge 176 of the wall 156.

In one embodiment, a characteristic glow is produced at an outer surface of the light passing wall when the light is transmitted through the light passing wall. By characteristic glow, it is meant that the coloration of the wall emanates from the wall rather than from the light source, i.e., the light is altered during transmission through the wall. In most cases, the characteristic glow is produced by a light directing element disposed in or on the wall. The light directing element is generally configured to scatter incident light by reflection and/or refraction. An example light directing elements that may be used is described in greater detail in a co-pending patent application entitled, "ACTIVE ENCLOSURE FOR COMPUTING DEVICE"; application Ser. No. 10/075,964, filed on even date and incorporated herein by reference.

Figure 8:
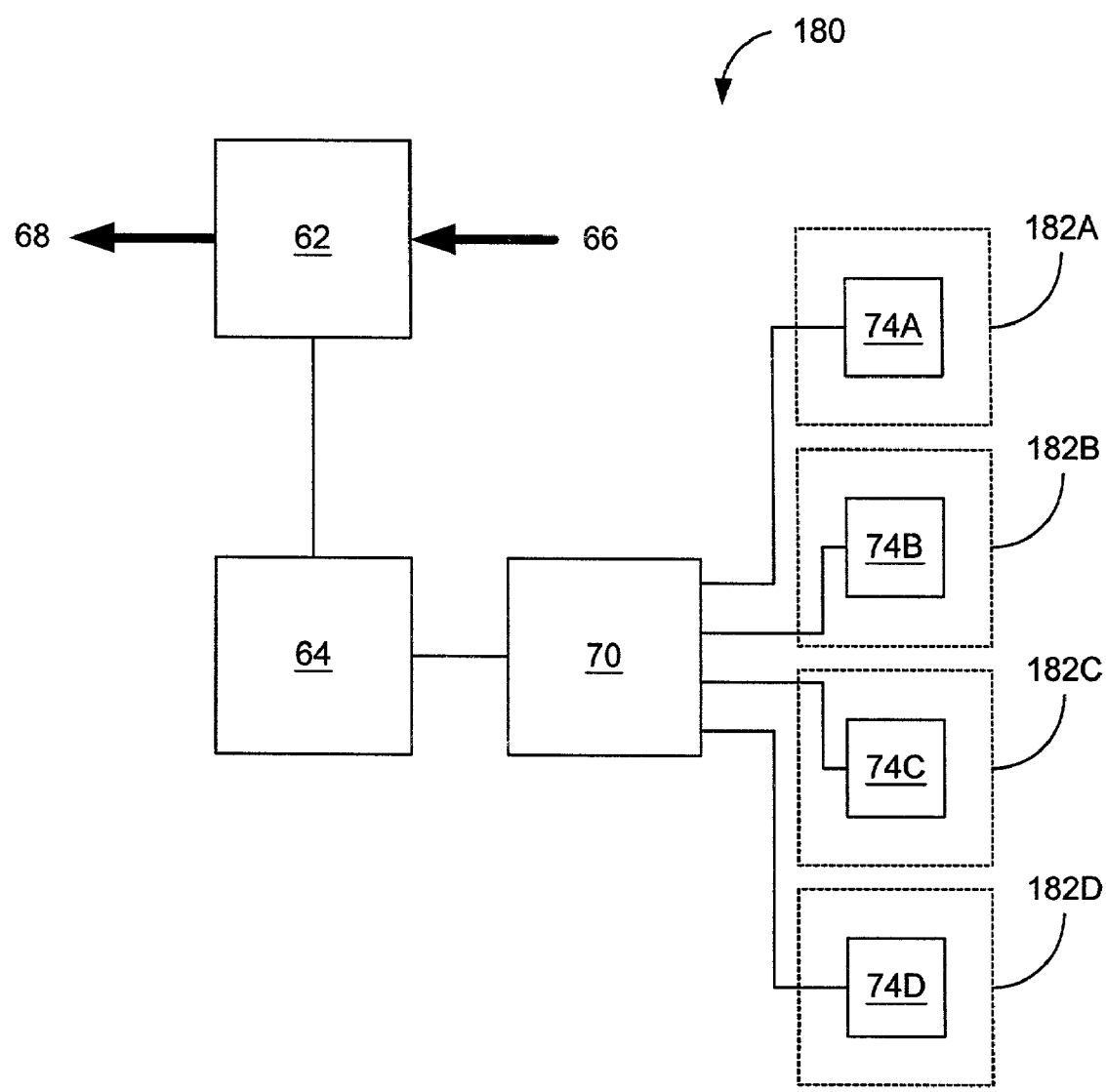
FIG. 8 is a block diagram of a computer system, in accordance with one embodiment of the present invention.

FIG. 8 is a block diagram of a computer system 180, in accordance with one embodiment of the present invention. This particular embodiment is similar to the embodiment shown in FIG. 4. For example, the computer system 180 includes a plurality of the light elements 74A–D. In the illustrated embodiment each of the light elements 74A–D has their own individual housing 182A–D. Each of the housings 182A–D includes one or more light passing walls. In one embodiment, each of the housings 182A–D corresponds to different components of the computer system 180. For example, housing 182A may be used to house the base components such as processors, controllers, memory, internal I/O devices and/or the like; housing 182B may be used to house monitor components such as a display screen; housing 182C may be used to house external peripheral I/O devices such as disk drives, printers, mice, keyboards, speakers and the like; and housing 182D may be used to house a docking station in the case of a portable computer.

Figure 9:
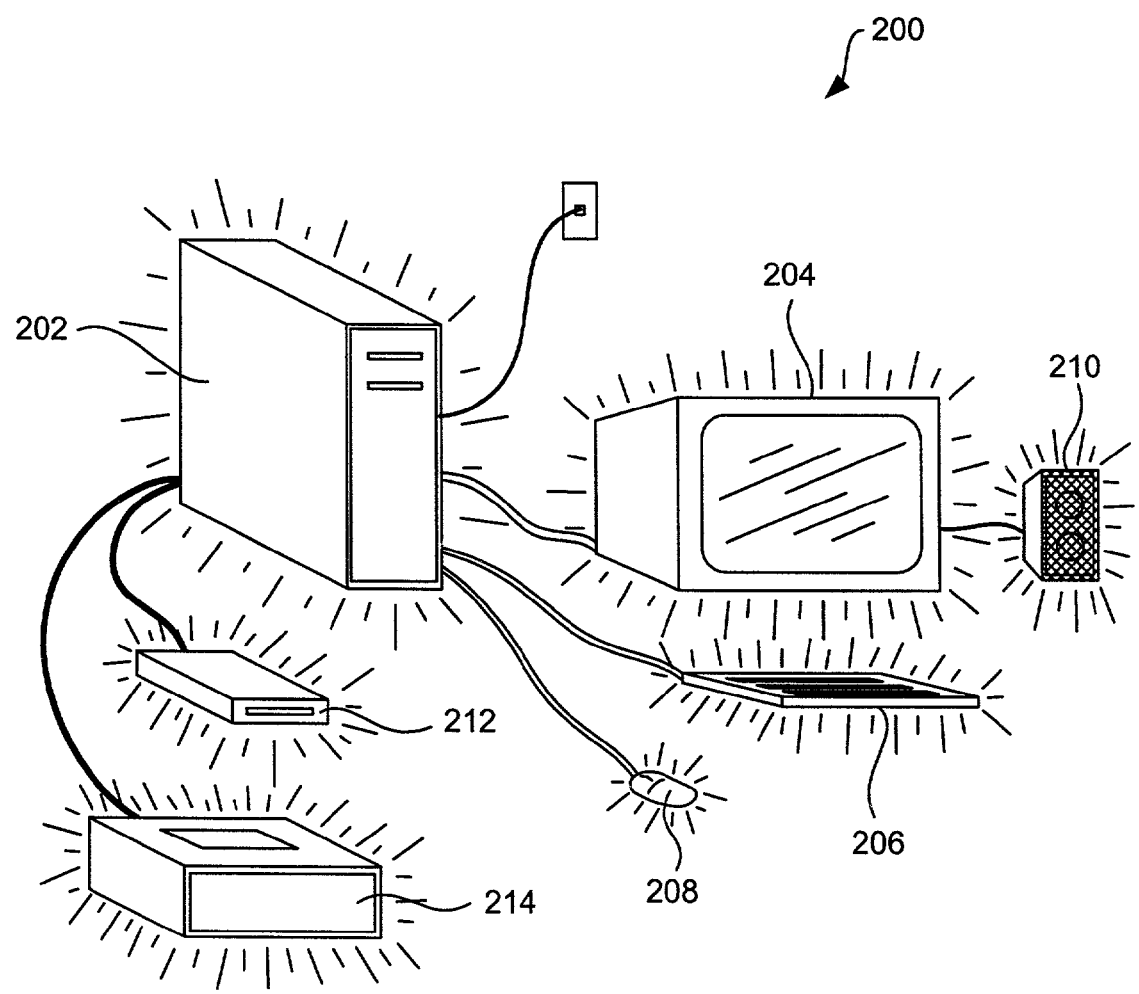
FIG. 9 is a perspective diagram of a computer system, in accordance with another embodiment of the present invention.

FIG. 9 is a perspective diagram of a computer system 200, in accordance with one embodiment of the present invention. By way of example, the computer system 200 may correspond to the computer system described in FIG. 8. The computer system 200 includes a base 202 operatively coupled to a plurality of peripheral devices such as a monitor 204, a keyboard 206, a mouse 208, a speaker 210, an external disk drive 212 and a printer 214. Each of these components is configured with an illuminable housing, i.e., a housing having at least one light passing wall, and a light source disposed therein. As stated throughout this document, the light source is configured to generate light for passing through the light passing wall so as to alter the ornamental appearance of the light passing wall.

A light effect manager, such as the light effect manager 70 illustrated in FIG. 8, can be used to control and coordinate the ornamental appearance of the various illuminable housings. The control and coordination of the ornamental appearance of the various illuminable housings can be achieved in many different ways.

In one embodiment, the light source(s) inside the base and the light source(s) inside the peripheral device are configured to actuate when the base is in communication with or processing tasks associated with the peripheral device. For example, when the base sends a signal to the printer, as for example a signal to print a document, the base and the printer may exude a light effect associated with printing. In addition, when the external disk drive sends data to the base, the external disk drive and base may exude a light effect associated with data retrieval. Moreover, when the base is playing music through the speaker, the base and the speaker may exude a light effect associated with outputting audio. In the case of audio, the light effect may correspond to the frequency of the audio signal so as to produce a light effect that changes with the music or sounds being played. The light effect may be different for different devices. For example, the base may be blue when communicating with the monitor and green when communicating with the printer.

Figure 10:
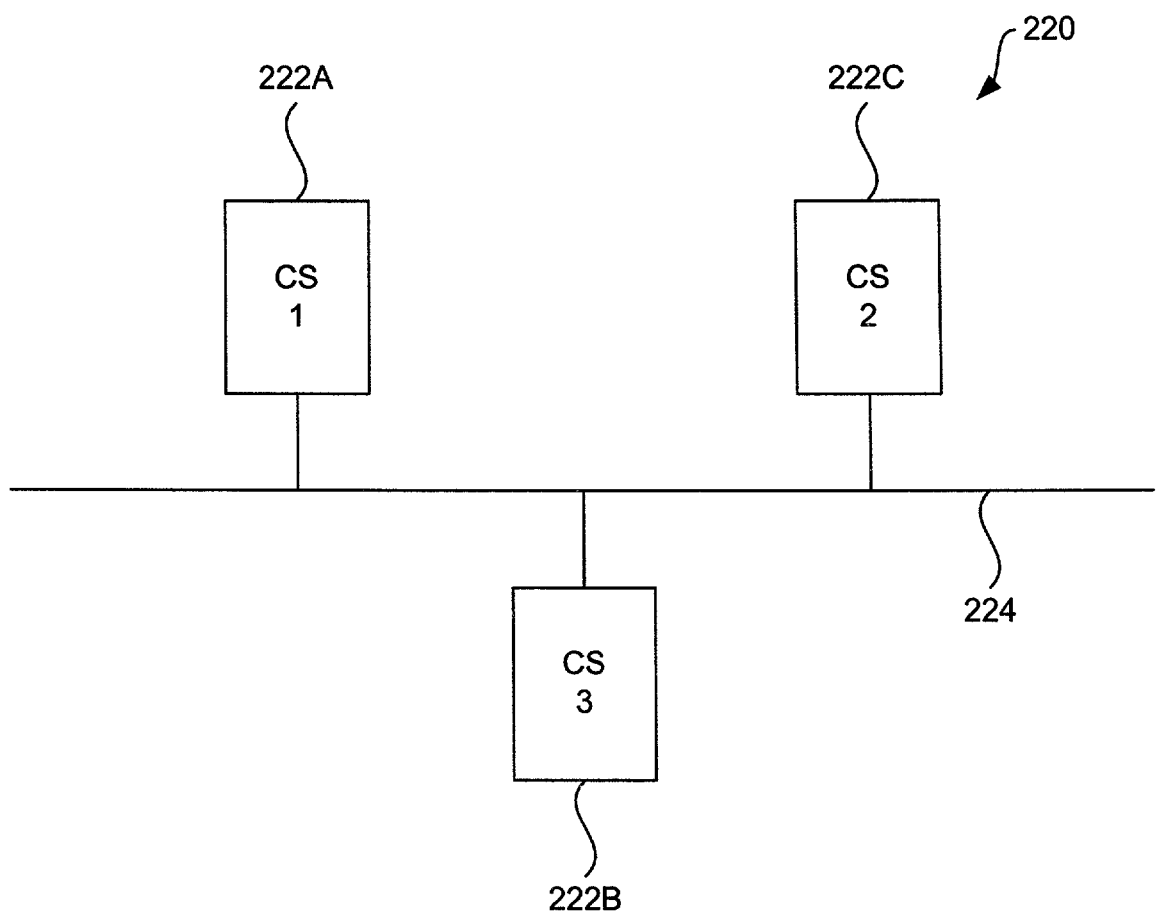
FIG. 10 is a simplified diagram of a computer network, in accordance with one embodiment of the present invention.

FIG. 10 is a simplified diagram of a computer network 220, in accordance with one embodiment of the present invention. The computer network 220 includes a plurality of computer systems 222A–222C which are connected via a network 224. By way of example, the network may represent a Local Area Network (LAN), Wide Area Network (WAN), Internet and the like, or a combination thereof. The network 224 can also be wired or wireless. The computers 222A–222C may, for example, be configured as any of the computers systems discussed above. As should be appreciated, each of the computer systems 222A–222C includes an illuminable housing capable of altering its ornamental appearance via light.

The computer system 222A–222C can individually alter their ornamental appearance. Alternatively, the computer systems 222A–222C can have their ornamental appearance centrally controlled. The central control can be provided by one of the computer systems 222A–222C or another computer. In one embodiment, the light source(s) inside each of the computer systems 222A–222C are configured to actuate when such computer systems 222A–222C are in communication with or processing tasks associated with another of the computer system 222A–222C. For example, when the computer system 222A sends or requests information to or from computer system 222B, both systems may exude a specific light effect. In one implementation, a master light effect manager residing in one of the computer systems 222A–222C provides central control over the ornamental appearance of the computer systems 222A–222C through interaction with slave light effect managers residing in other of the computer systems 222A–222C.

Figure 11:
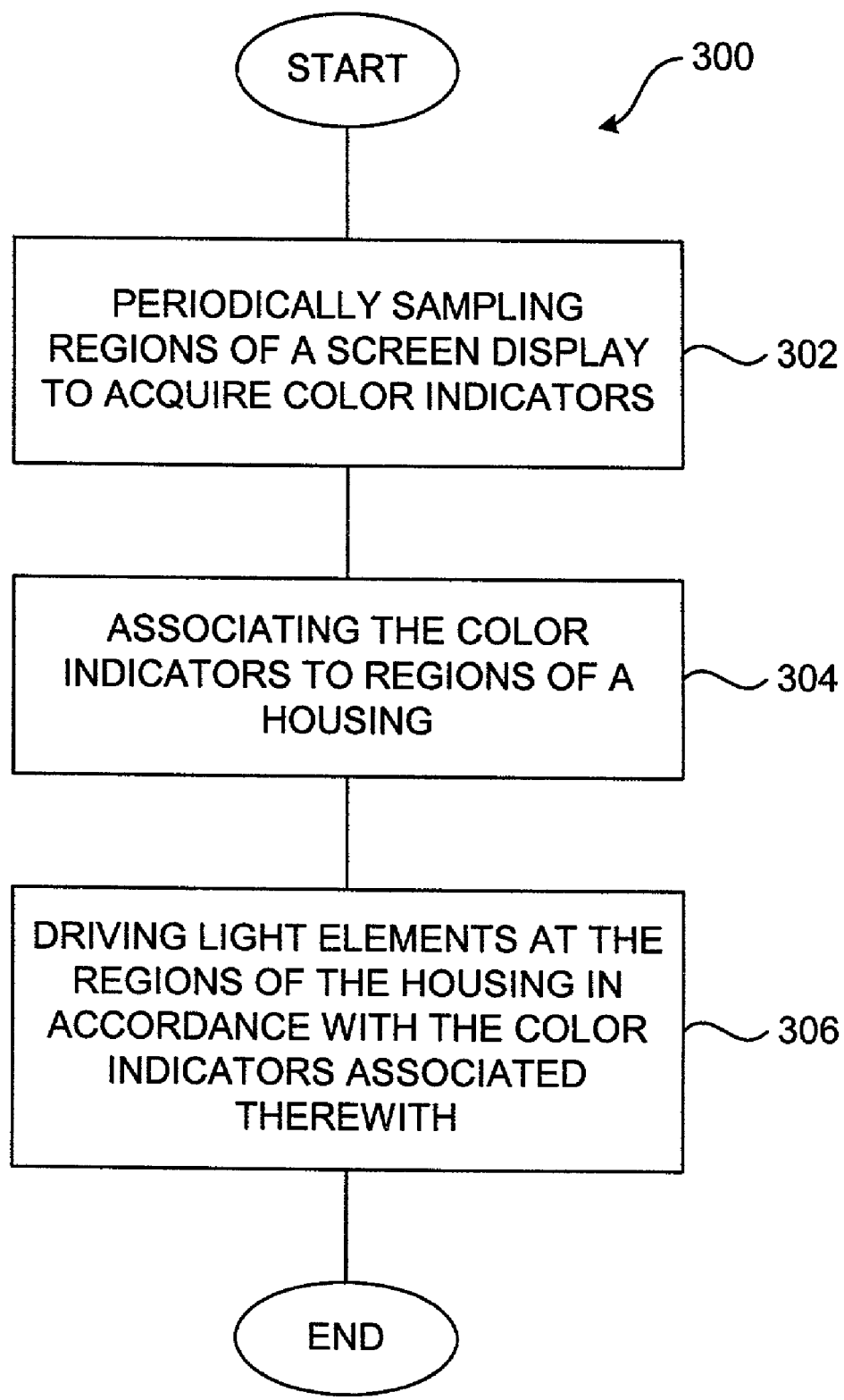
FIG. 11 is a flow diagram of illumination processing, in accordance with one embodiment of the present invention.

FIG. 11 is a flow diagram of illumination processing 300, in accordance with another embodiment of the invention. The illumination processing 300 is, for example, performed by a computing device or system that includes a display screen. The computing device or system that performs the illumination processing 300 can, for example, be the computing device or system shown in FIG. 4, 5, 6 or 7.

The illumination processing 300 begins at step 302 by periodically sampling regions of a display screen so as to acquire color indicators for each of the regions. After acquiring the color indicators, the process proceeds to step 304 where the color indicators are associated to zones (regions) of a housing corresponding to the computing device or system. For example, the housing can pertain to the primary housing for enclosing a base computer, a screen display, or a peripheral device. In one embodiment, step 304 pertains to a mapping operation during which the regions of the screen display that were sampled in step 302 are mapped to counterpart zones of the housing.

After associating the color indicators to the zones, the process proceeds to step 306 where light elements are driven in accordance with the color indicators associated therewith. These light elements are located at the zones of the housing.

The driven light elements operate to illuminate the zones of the housing. Following step 306, the illumination processing 300 is complete and ends. However, the illumination processing 300 is typically performed constantly or periodically such that the light elements can be driven 306 in accordance with the color indicators acquired from the screen display.

In one embodiment, the illumination processing 300 mimics the colors appearing at the regions of the screen display to zones of the housing. In one example, the regions of the screen display can be associated with a color configuration, and the regions of the housing can be provided with the same configuration. This is generally done to extend the feel of the display screen to the housing. For example, if the regions of the display screen are blue, then the counterpart zones of the housing are also blue. In addition, if different regions of the display screen are different colors, then different zones of the housing are also different colors.

Figure 12:
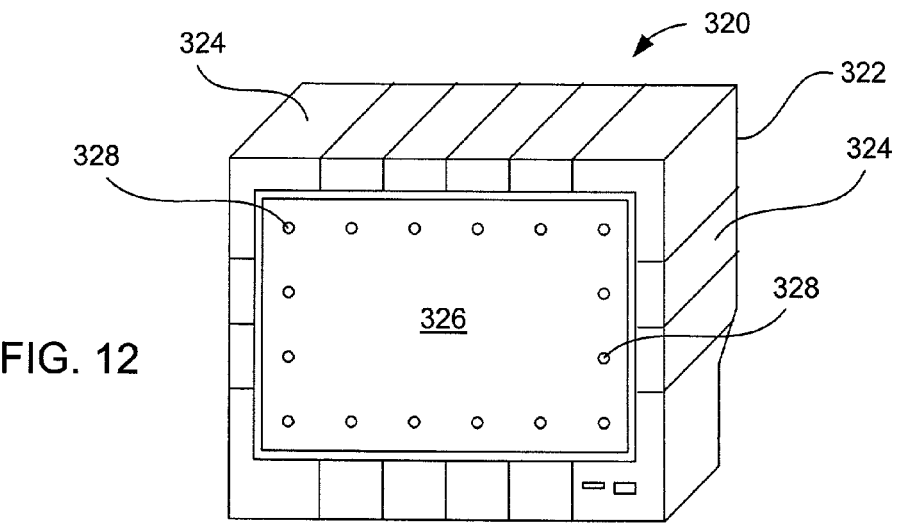
FIG. 12 is a perspective diagram of a monitor, in accordance with one embodiment of the present invention.
Figure 13:
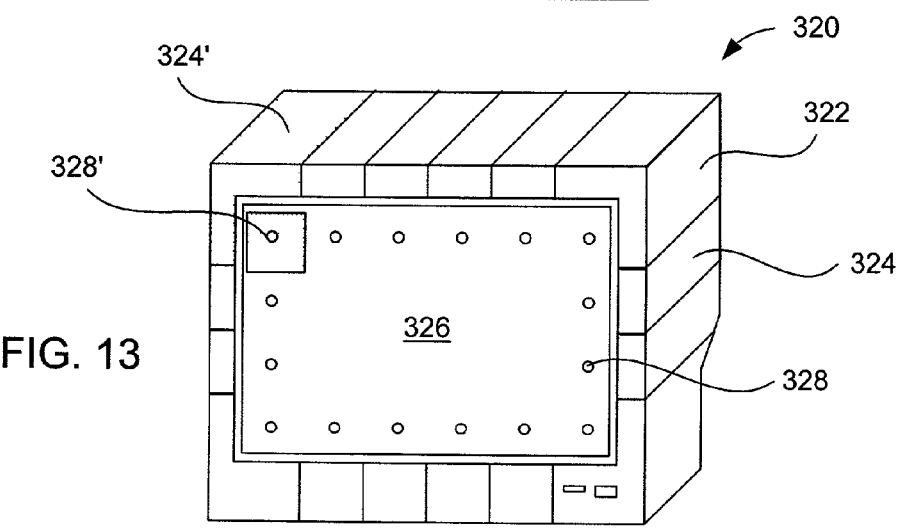
FIG. 13 is a perspective diagram of a monitor, in accordance with one embodiment of the present invention.

FIG. 12 is a perspective diagram of a display monitor 320, in accordance with one embodiment of the present invention. The display monitor 320 includes a housing 322 that is divided into several independent and spatially distinct illuminable zones 324. Any number of zones may be used. In the illustrated embodiment, the housing 322 includes 16 illuminable zones 324. Each of the zones 324 has an associated light element (not shown), which is disposed inside the housing proximate the zone. As should be appreciated, the associated light element is configured to light up its corresponding zone. By way of example, the associated light element may be an LED array capable of illuminating the corresponding zone faith a plurality of colors (e.g., the LED array may include a red, green and blue LED). In the illustrated embodiment, the zones 324 are positioned around the periphery of the housing 322, and include portions that are on the front of the monitor 320, as well as portions that are on the side of the monitor 320. It should be noted, however, that this is not a limitation and that the zones may be configured differently relative to the monitor 320. For example, the zones may be positioned in the rear, or only on one side of the monitor 320.

As shown, the housing 322 is configured to structurally support a display screen 326 in its assembled position within the housing 322. The portion of the display screen 326 that is viewed by the user is positioned in the front of the monitor 320 behind an opening in the housing 322 as shown. As previously mentioned, the display screen 326 is configured to present text and graphics to the user. For example, the display screen may present text and graphics associated with application or operating system programs. During illumination processing, as for example illumination processing 300, regions 328 of the display screen 326 are periodically sampled to acquire color indicators. In one embodiment, the color indicators represent the primary color that is being displayed in the region (e.g., several colors may be displayed in a region). For example, if the region is generally seen as blue then the color indicator is blue. The color indicators are used to drive the light elements of the zones 324 as described above. The regions 328 may be any suitable area inside the display screen. In the illustrated embodiment, the regions 328 are disposed about the outer periphery of the display screen 326.

In one embodiment, the regions 328 of the display screen 326 are mapped to counterpart zones 324 of the housing 322. As such, when regions of the display screen change so do the counterpart zones. In the illustrated embodiment, there is a sample region 328 for every zone 324. The sample region 328 may correspond to any suitable zone 324. In the illustrated embodiment, however, individual sample regions correspond to individual zones positioned nearest the location of the individual sample region. For example, sample region 328' corresponds to zone 324'. Accordingly, when sample region 328' changes from a first color to a second color, the counterpart zone 324' changes from the first color to the second color.

In one embodiment, an event monitor such as any one of the event monitors described above is used to sample various locations of the display screen 326. The event monitor alerts a light effect manager when a certain graphic is displayed. As such, the light manager can send a control signal to a light element to dynamically adjust one or more of the zones in accordance with sample. By way of example, and referring to FIG. 13, when the sample region 328' changes, an event monitor sends event information to a light effect manager, and the light effect manager sends a corresponding control signal to the light element housed beneath zone 324' commanding the light element to light up (i.e., the light element illuminates the zone 324' with light), thereby changing the zone 324' along with the sample region 328'. For example, if the sample region 328' changes to blue, then the zone 324' will also change to blue. It should be noted that changing to the same color is not a limitation and that the zone may be configured to change to colors other than the color of the sample region. In one embodiment, the light effect manager is configured to consult an illumination table containing illumination characteristics before sending the control signal to the light source.

Figure 14:
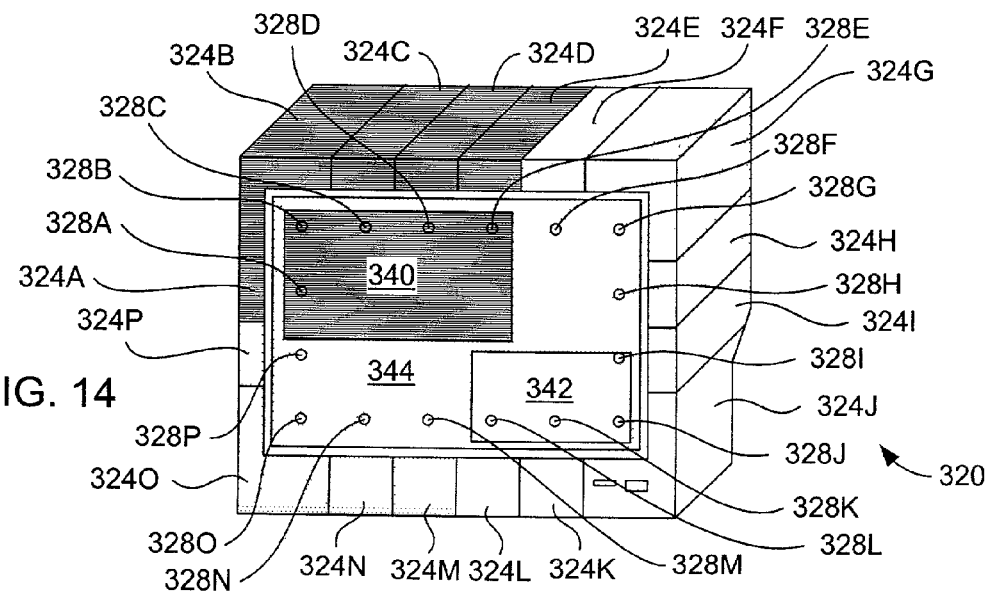
FIG. 14 is a perspective diagram of a monitor, in accordance with one embodiment of the present invention.

By way of another example, FIG. 14 is a perspective diagram of the display monitor 320 presenting a first window 340 and a second window 342 over a wallpaper backdrop 344 on the display screen 326. In this configuration, some of the sampled regions 328 correspond to the colors of the first window 340, some of the sampled regions 328 correspond to the colors of the second window 342 and the remaining sampled regions correspond to the colors of the wallpaper backdrop 344. In the illustrated embodiment, the individual zones 324 associated with the different sampled regions 328 are configured to output a similar color. For example, sampled regions 328A–E and zones 324A–E located near sampled regions 328A–E may output a first color such as green, sampled regions 328I–L and zones 324I–L located near sampled regions 328I–L may output a second color such as white, and sampled regions 328F–G&M–P and zones 324F–G&M–P located near sampled regions 328F–G&M–P may output a third color such as blue.

By way of another example, FIGS. 15A–15F are perspective diagrams of the display monitor 320 of FIG. 14 presenting a video or gaming sequence 350. By way of example, the video may correspond to a movie being played on a DVD drive or a being played on a CD drive. In the illustrated embodiments, the sequence 350 corresponds to a spaceship 352 that encounters an asteroid 354 in space 356. This is by way of example and not by way of limitation.

Figure 15A:
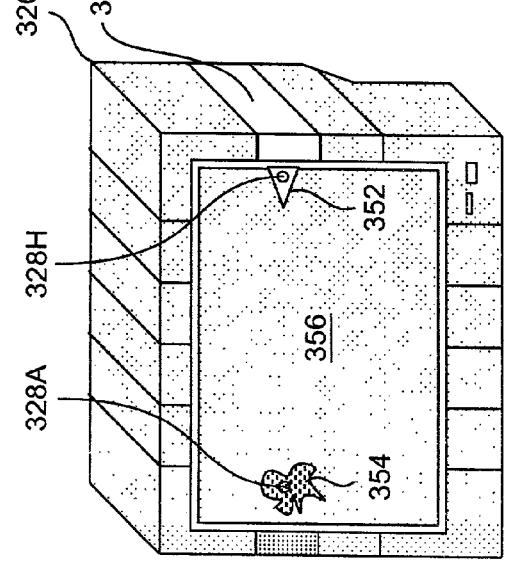
FIGS. 15A–15F are perspective diagrams of a monitor presenting a sequence, in accordance with one embodiment of the present invention.

FIG. 15A shows a first sequence where the asteroid 354 and spaceship 352 enter the display screen 326 from opposing sides. As such, sampled region 328A includes the asteroid 354, sampled region 328H includes the spaceship 352 and the remaining sampled regions 328B–328G and 328I–328P include space 356 therein. As a result, the associated zone 324A exudes a light effect similar to the asteroid 354, the associated zone 324H exudes a light effect similar to the spaceship 352 and the associated zones 324B–324G and 324I–324P exude a light effect similar to space 356. For example, zone 324A may be brown to correspond to a brown asteroid, zone 324H may be orange to correspond to an orange spaceship, and zones 324B–324G and 324I–324P may be blue to correspond to blue space.

Figure 15B:
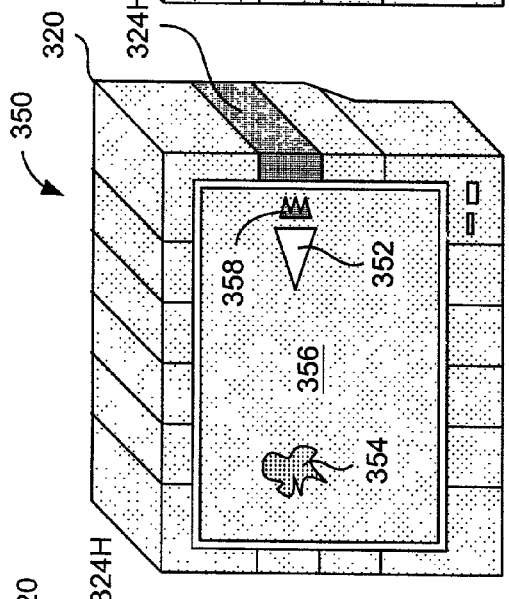

FIG. 15B shows a second sequence where the asteroid 354 and space ship 352 move closer together and away from their respective sides. As such, sample regions 328A–328G and 328I–328P now include space 356 and sample region 328H now includes exhaust 358 from the space ship 352. As a result, zones 324A–324G and 324I–324P now exude a light effect similar to space 356 and the associated zone 324H now exudes a light effect similar to the exhaust 358. By way of example, zones 324A–324G and 324I–324P may be blue to correspond to blue space and zone 324H may be yellow to correspond to the yellow exhaust.

Figure 15C:
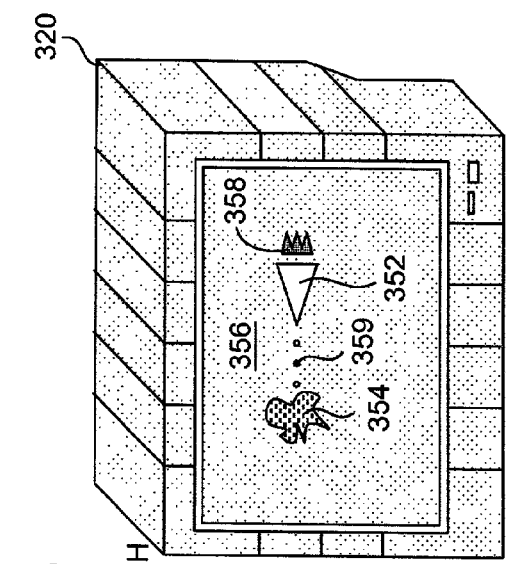
Figure 15D:
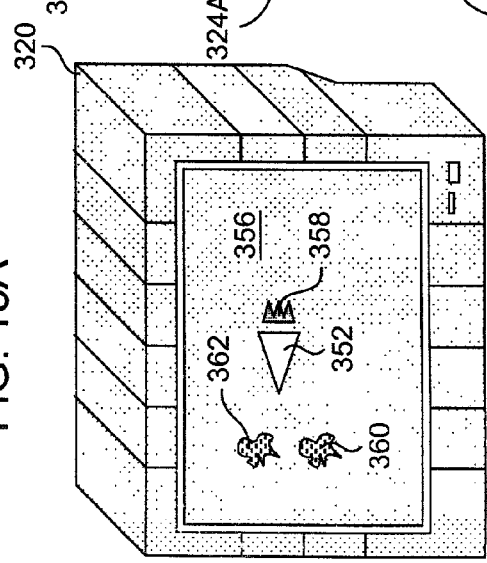

FIGS. 15C and 15D show a third and fourth sequence where the spaceship 352 fires bullets 359 at the asteroid 354 so as to split the asteroid 354 into two smaller asteroids 360 and 362. The third and fourth sequence also show the spaceship 352 continuing to move towards the asteroid 354, and the two smaller asteroids 360, 362 moving away from the spaceship 352 after splitting. As such, all the sample regions 328A–328P now include space 356. As a result, zones 324A–324P now exude a light effect similar to space 356. For example, zones 324A–324P may be blue to correspond to blue space.

Figure 15E:
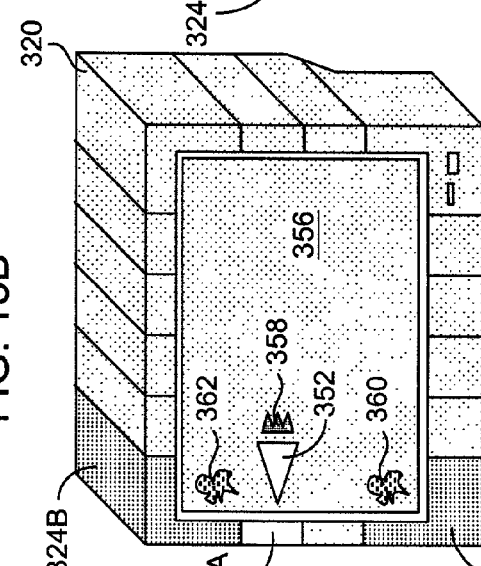

FIG. 15E shows a fifth sequence where the spaceship 352 continues to move towards the asteroids 360, 362, and the asteroids 360, 362 continue to move away from the spaceship 352 at an angle. As such, sample region 328O now includes the first asteroid 360, sample region 328B now includes the second asteroid 362, sample region 328A now includes the spaceship 352 and sample regions 328C–328N and 328P now include space 356. As a result, the associated zone 324O exudes a light effect similar to the first asteroid 360, associated zone 324B exudes a light effect similar to the second asteroid 362, the associated zone 324A exudes a light effect similar to the spaceship 352, and the remaining zones 324C–324N and 324P exude a light effect similar to space 356. For example, zones 324O and 324B may be brown to correspond to a brown asteroid, zone 324A may be orange to correspond to an orange spaceship, and zones 324C–324N and 324P may be blue to correspond to blue space.

Figure 15F:
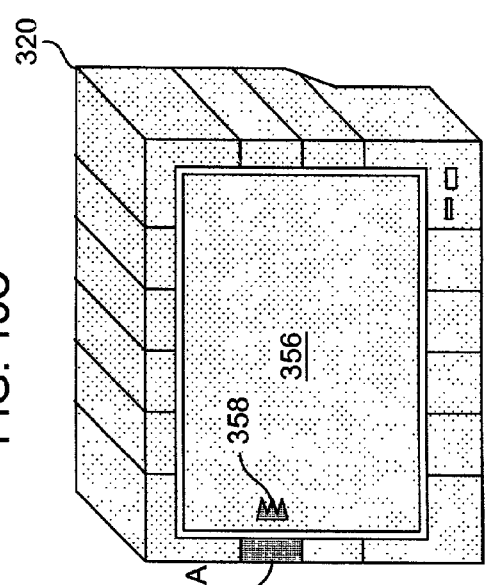

FIG. 15F shows a sixth sequence where the asteroids 360, 362 and the spaceship 352 have exited the side of the display screen 326. As such, sample region 328A now includes the exhaust 358 of the spaceship 352 and sample regions 328B–328P now include space 356. As a result, the associated zone 324A now exudes a light effect similar to the exhaust 358, and the remaining zones 324B–324P exude a light effect similar to space 356. For example, zone 324A may be yellow to correspond to yellow exhaust, and zones 324B–324P may be blue to correspond to blue space.

Figure 16A:
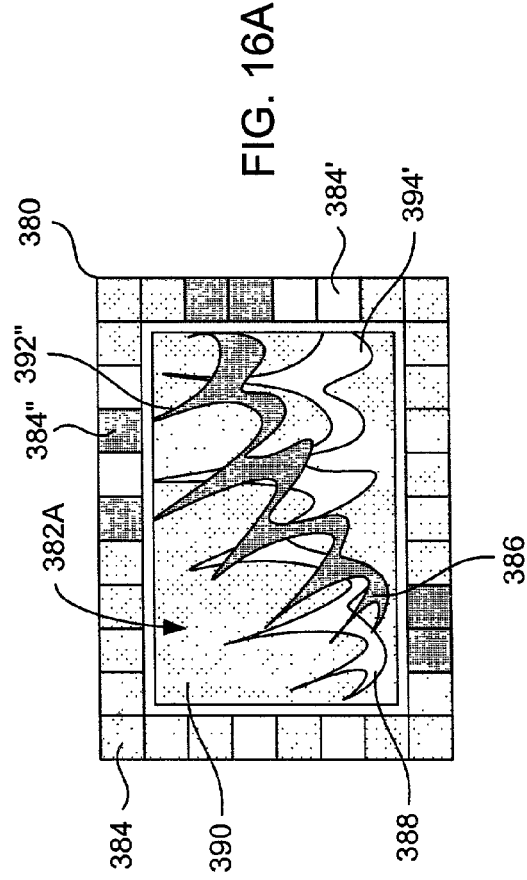
FIGS. 16A–16B are simplified diagrams of a monitor presenting a sequence, in accordance with one embodiment of the present invention.
Figure 16B:
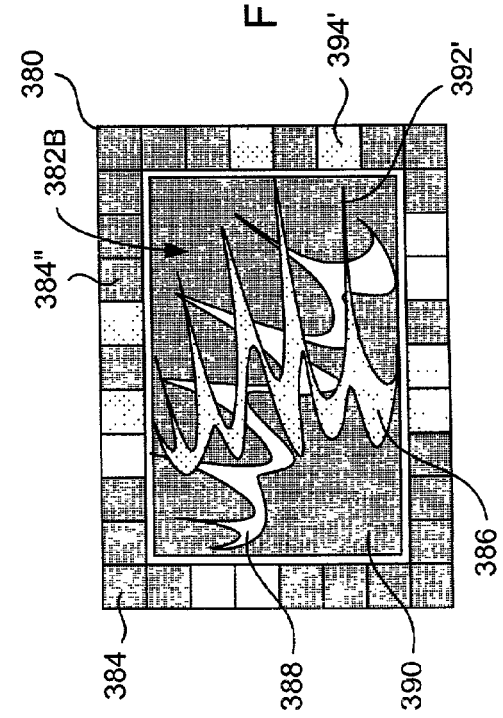

By way of another example, FIGS. 16A and 16B are simplified diagrams of a display monitor 380 presenting two segments 382A and 382B of a programmed sequence 382. Display monitor 380 is similar to display monitor 320 of FIG. 14, and as such, the display monitor 380 includes a plurality of illuminable zones 384. In the illustrated embodiment, the programmed sequence 382 corresponds to a computer program that allows users of the computer system to visualize their music. The computer program is arranged to display a stunning light show (e.g., different colors or patterns) on the display screen of the display monitor 380 that changes, throbs, and pulses to the beat of the user's music. For example, the computer program may adjust its color and patterns relative to the frequency of the music being played in the computer system. The music may be imported from a CD or DVD player, MP3 player, internet, or it may be stored in the computer system itself. By way of example, the computer program may correspond to the computer program iTunes produced by Apple Computer of Cupertino, Calif.

The programmed sequence 382 may take on many forms. In the illustrated embodiment, the programmed sequence 382 is a multicolored graphical display that includes a plurality of patterns 386 and 388 that move through a wall paper back drop 390. The plurality of patterns 386 and 388 may follow a random or predetermined route. FIG. 16A illustrates the patterns 386 and 388 in a first position, and FIG. 16B illustrates the patterns 386 and 388 in a second position along the route. These positions may or may not be consecutive. In this embodiment, the plurality of patterns 386 and 388 represent frequency distributions having peaks 392 and troughs 394. The patterns 386 and 388 may adjust their configuration as they move through the wall paper backdrop 390. For example, the peaks and troughs 392 and 394 may change their period and amplitude or they may change their color (e.g., 386). The frequency distributions may be based on the frequencies of the music being played on the computer system or they may be predetermined.

Similarly to FIGS. 12–15, regions of the display screen are mapped to counterpart illuminable zones 384. As such, when regions of the display screen change so do the counterpart zones. As mentioned, there is generally a sample region for every illuminable zone 384. The sample region may correspond to any suitable zone 384, however, they typically correspond to individual zones positioned nearest the location of the individual sample region. As shown in FIGS. 16A and 16B, the peaks and troughs 392 and 394 move into and exit different regions of the display screen as they change their configuration and position. As such, the illuminable zones 384 are continuously changing so as to produce a light effect that corresponds to the changing regions. For example, in FIG. 16A, the configuration (e.g. color, intensity) of the illuminable zone 384' corresponds to the configuration (e.g. color, intensity) of the trough 394' of pattern 388, and in FIG. 16B, the configuration (e.g. color, intensity) of the illuminable zone 384' corresponds to the configuration (e.g. color, intensity) of a peak 392' of the pattern 386. In addition, in FIG. 16A, the configuration of the illuminable zone 384" corresponds to the configuration of a peak 392" the pattern 386, and in FIG. 16B, the configuration of the illuminable zone 384" corresponds to the configuration of the wall paper backdrop 390.

Figure 17A:
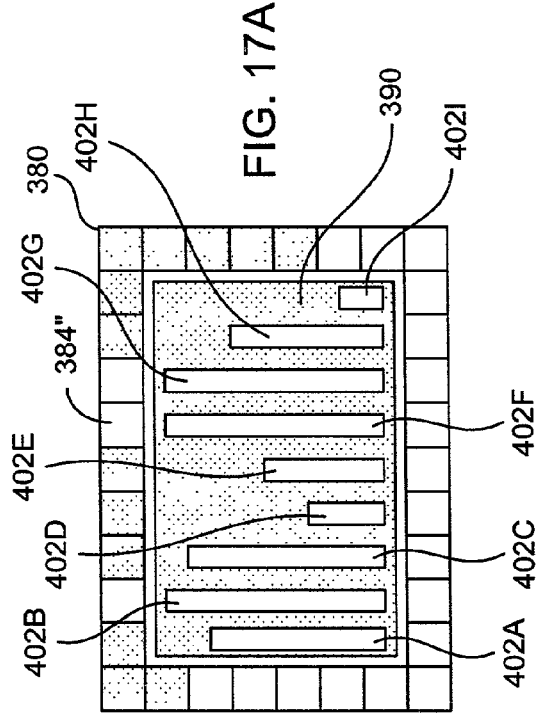
FIGS. 17A–17B are simplified diagrams of a monitor presenting a sequence, in accordance with one embodiment of the present invention.
Figure 17B:
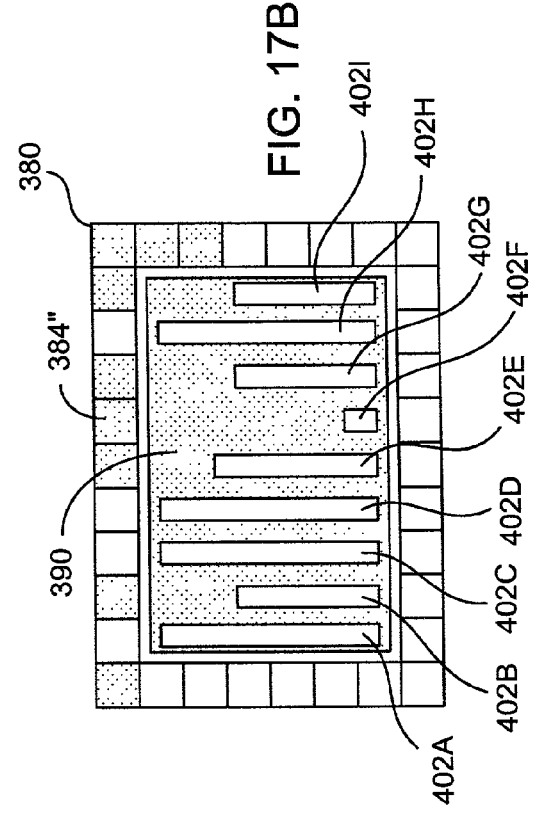

By way of another example, FIGS. 17A and 17B are simplified diagrams of the display monitor 380 presenting two segments 400A and 400B of a programmed sequence 400. Like the programmed sequence 382, the programmed sequence 400 corresponds to a computer program that allows users of the computer system to visualize their music. The programmed sequence 400 may take on many forms. In the illustrated embodiment, the programmed sequence 400 is a graphical display that includes a plurality of pulsating distributions 402A–I that move through a wall paper back drop 404. The pulsating distributions 402A–I are generally configured to act like an equalizer and thus they change (move up and down) in accordance with the frequency of the music being played in the computer system. FIG. 17A illustrates the pulsating distributions 402A–I in a first position, and FIG. 17B illustrates the pulsating distributions 402A–I in a second position.

Similarly to FIGS. 12–16, regions of the display screen are mapped to counterpart illuminable zones 384. As such, when regions of the display screen change so do the counterpart zones. As mentioned, there is generally a sample region for every illuminable zone 384. The sample region may correspond to any suitable zone 384, however, they typically correspond to individual zones positioned nearest the location of the individual sample region. As shown in FIGS. 17A and 17B, the pulsating distributions 402A–I move into and exit different regions of the display screen as they change their configuration and position. As such, the illuminable zones 384 are continuously changing so as to produce a light effect that corresponds to the changing regions. For example, in FIG. 17A, the configuration (e.g. color, intensity) of the illuminable zone 384" corresponds to the configuration (e.g. color, intensity) of the pulsating distribution 402F, and in FIG. 17B, the configuration (e.g. color, intensity) of the illuminable zone 384" corresponds to the configuration (e.g. color, intensity) of the wall paper backdrop 390.

It should be noted that a methodology similar to methodology shown in FIGS. 16 and 17 may also be used to change the zones in accordance with the music itself rather than with the visual output of the display screen.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of extending the feel of a display screen to a housing that surrounds the display screen, the housing being separated into a plurality of independent illuminable zones, each of the zones having a light element that is disposed inside the housing in the area of the illuminable zone, said method comprising:
    associating regions of the display screen to particular illuminable zones;
    determining color indicators for a plurality of regions on the screen display that are associated with the illuminable zones; and
    illuminating the illuminable zones of the housing based on the color indicators of the regions associated therewith, the illumination being provided by light from the light element of the particular illuminable zone, the illumination colorizing the illuminable zone of the housing in conjunction with the color of the associated region of said extending the feel of said display screen.

2. A method as recited in claim 1, the computing device is a general purpose computer.

3. A method for illuminating a housing of a computing system, the computing system having a screen display, said method comprising:
    providing illuminable regions to the housing around and adjacent the screen display;
    mapping illuminable regions of the housing to regions of the screen display;
    sampling regions of the screen display to acquire color indicators; and
    colorizing the illuminable regions of the housing in accordance with the acquired color indicators mapped thereto in order to extend the feel of the screen display to the housing, said colorizing including illuminating the illuminable regions with light from one or more light elements located at each of the illuminable regions of the housing.

4. A method as recited in claim 3, wherein the housing of the computing system being illuminated houses at least a microprocessor, memory and input/output ports.

5. A method as recited in claim 3, wherein the housing of the computing system being illuminated houses at least the screen display.

6. A method as recited in claim 3, the computing system is a general purpose computer.

7. A method as recited in claim 3, wherein said method is periodically performed such that the regions of the housing being illuminated are color matched with the regions of the screen display.

* * * * *

UNITED STATES PATENT AND TRADEMARK OFFICE
CERTIFICATE OF CORRECTION

| | | |
|---|---|---|
| PATENT NO. | : 7,113,196 B2 | Page 1 of 1 |
| APPLICATION NO. | : 10/075520 | |
| DATED | : September 26, 2006 | |
| INVENTOR(S) | : Duncan Kerr | |

It is certified that error appears in the above-identified patent and that said Letters Patent is hereby corrected as shown below:

Column 17, line 30, change "faith" to --with--.

Column 18, line 52, change "a being" to --a game being--.

Column 20, line 46, change "392 the pattern" to --392 of the pattern--.

Signed and Sealed this

Twenty-sixth Day of June, 2007

JON W. DUDAS
*Director of the United States Patent and Trademark Office*